United States Patent
Kim et al.

(10) Patent No.: US 11,368,665 B2
(45) Date of Patent: *Jun. 21, 2022

(54) CAMERA MODULE AND DEPTH INFORMATION EXTRACTION METHOD THEREFOR

(71) Applicant: LG INNOTEK CO., LTD., Seoul (KR)

(72) Inventors: Eun Song Kim, Seoul (KR); Seong Ha Jang, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/972,303

(22) PCT Filed: Jun. 5, 2019

(86) PCT No.: PCT/KR2019/006824
§ 371 (c)(1),
(2) Date: Dec. 4, 2020

(87) PCT Pub. No.: WO2019/235859
PCT Pub. Date: Dec. 12, 2019

(65) Prior Publication Data
US 2021/0235059 A1    Jul. 29, 2021

(30) Foreign Application Priority Data
Jun. 7, 2018   (KR) .................. 10-2018-0065467

(51) Int. Cl.
*H04N 13/214* (2018.01)
*H04N 13/271* (2018.01)
*H04N 5/225* (2006.01)

(52) U.S. Cl.
CPC ......... *H04N 13/214* (2018.05); *H04N 5/2254* (2013.01); *H04N 5/2256* (2013.01); *H04N 5/2257* (2013.01); *H04N 13/271* (2018.05)

(58) Field of Classification Search
USPC .......................................................... 348/49
See application file for complete search history.

(56) References Cited

U.S. PATENT DOCUMENTS

| | | | |
|---|---|---|---|
| 5,892,575 A | 4/1999 | Marino | |
| 2004/0012710 A1* | 1/2004 | Yaji ..................... | H04N 5/2254 348/362 |

(Continued)

FOREIGN PATENT DOCUMENTS

| | | |
|---|---|---|
| EP | 2 813 862 A1 | 12/2014 |
| KR | 10-2010-0010318 A | 2/2010 |

(Continued)

*Primary Examiner* — Behrooz M Senfi
(74) *Attorney, Agent, or Firm* — Birch, Stewart, Kolasch & Birch, LLP

(57) ABSTRACT

A camera module according to one embodiment of the present invention comprises: a lighting unit for outputting an output light signal emitted at an object; a lens unit including an infrared (IR) filter and at least one sheet of a lens arranged on the IR filter, and condensing an input light signal reflected from the object; a tilting unit for shifting the optical path of the input light signal by controlling the tilt of the IR filter; an image sensor unit for generating an electric signal from the input light signal condensed by the lens unit and shifted by the tilting unit; an image control unit for extracting depth information of the object by using a phase difference between the output light signal and the input light signal received by the image sensor unit; and a detection unit for detecting tilt information of the IR filter and providing the tilt information of the IR filter to the image control unit.

20 Claims, 20 Drawing Sheets

(56) References Cited

U.S. PATENT DOCUMENTS

| | | | |
|---|---|---|---|
| 2004/0268373 A1* | 12/2004 | Song | G11B 7/0933 |
| | | | 720/683 |
| 2008/0246847 A1* | 10/2008 | Suda | H04N 5/23212 |
| | | | 348/207.11 |
| 2015/0002664 A1 | 1/2015 | Eppinger et al. | |
| 2017/0127036 A1* | 5/2017 | You | G01S 17/894 |
| 2017/0248796 A1 | 8/2017 | Banks et al. | |
| 2018/0115689 A1* | 4/2018 | Lin | G02B 5/208 |
| 2020/0329202 A1* | 10/2020 | Toriumi | H04N 5/23299 |
| 2021/0173126 A1* | 6/2021 | Lee | G02B 26/005 |

FOREIGN PATENT DOCUMENTS

| | | | | |
|---|---|---|---|---|
| KR | 20140028536 A | * | 3/2014 | G01B 11/22 |
| KR | 10-2014-0073117 A | | 6/2014 | |
| KR | 10-1629610 B1 | | 6/2016 | |
| KR | 10-2017-0050058 A | | 5/2017 | |
| KR | 101925028 B1 | * | 12/2018 | |

\* cited by examiner

[FIG. 1]
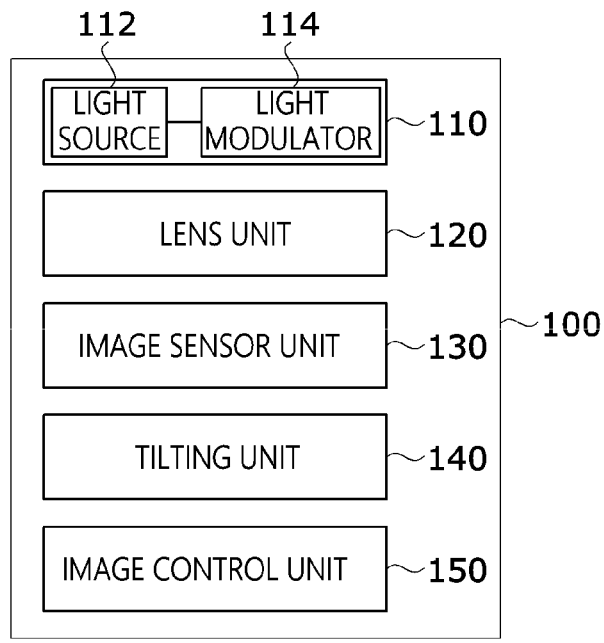
[FIG. 2]
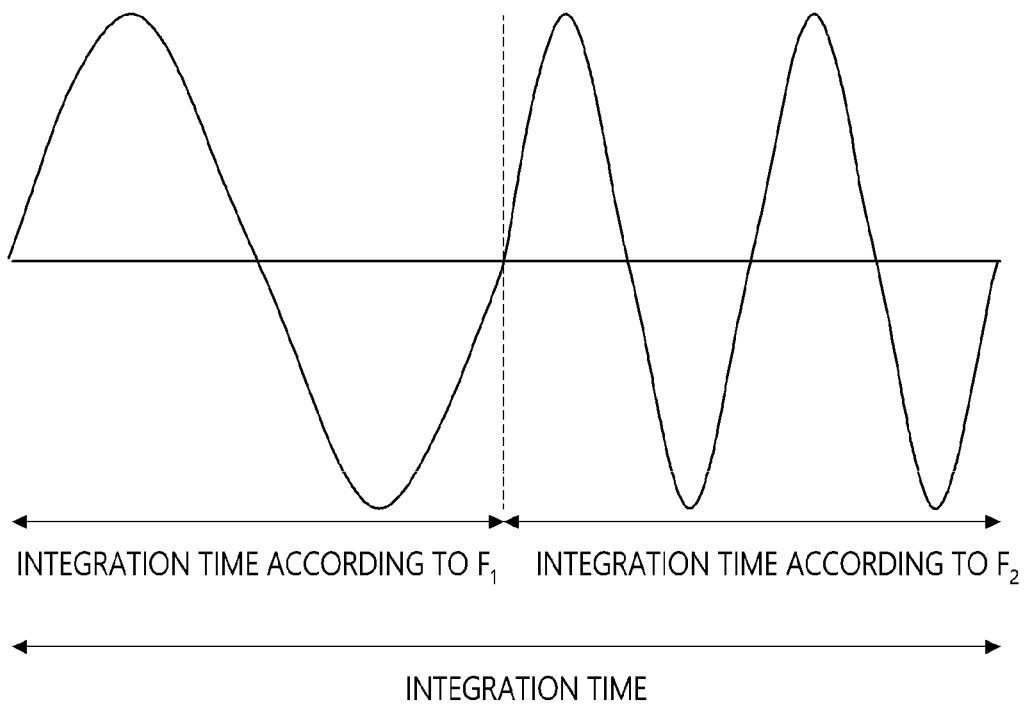

[FIG. 3]
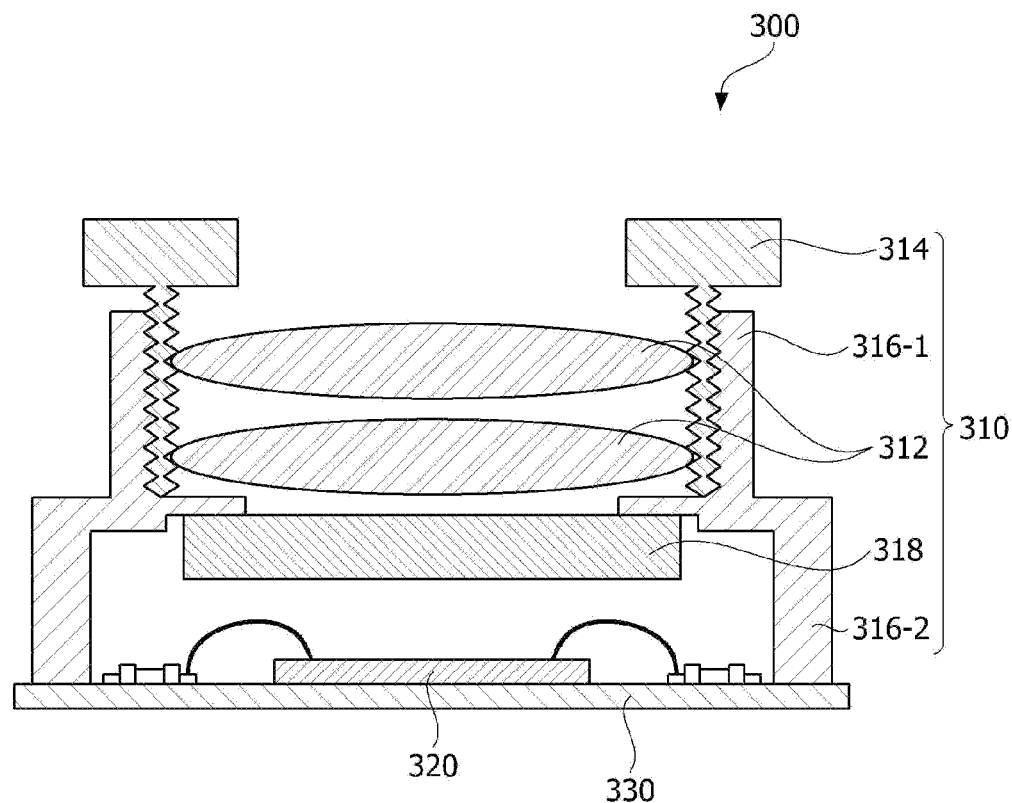
[FIG. 4]
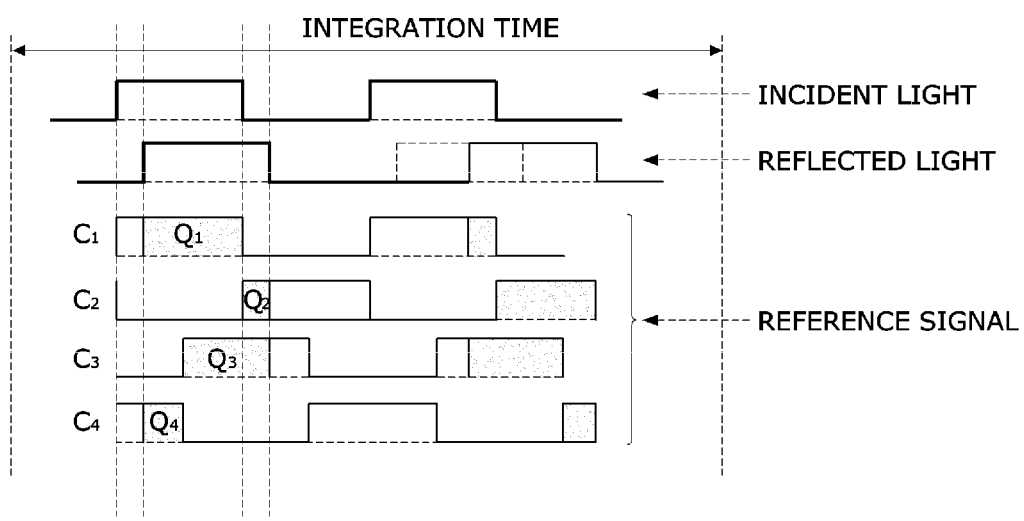

[FIG. 5]
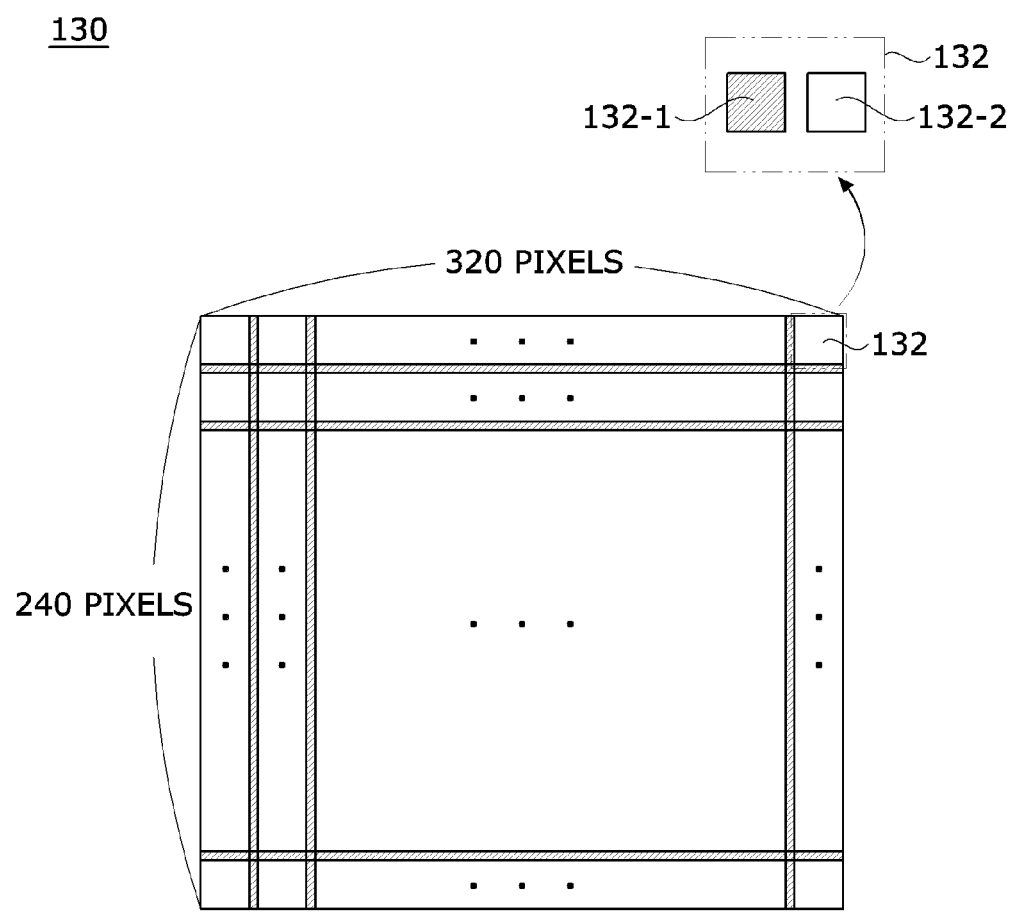

[FIG. 6]
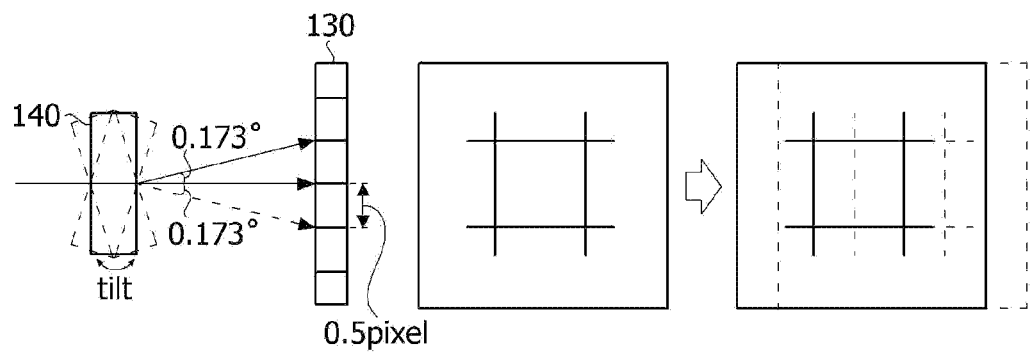
(a)
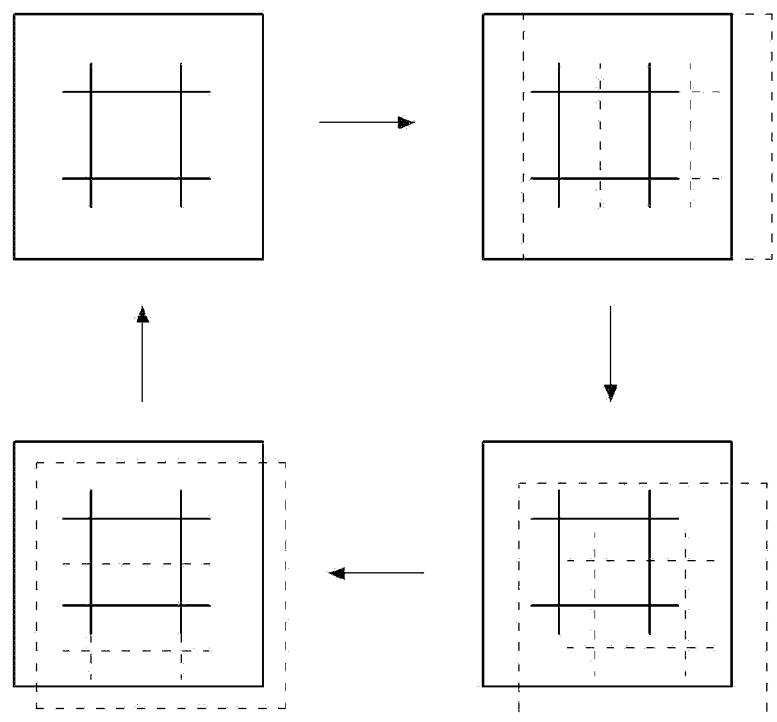
(b)

[FIG. 7]
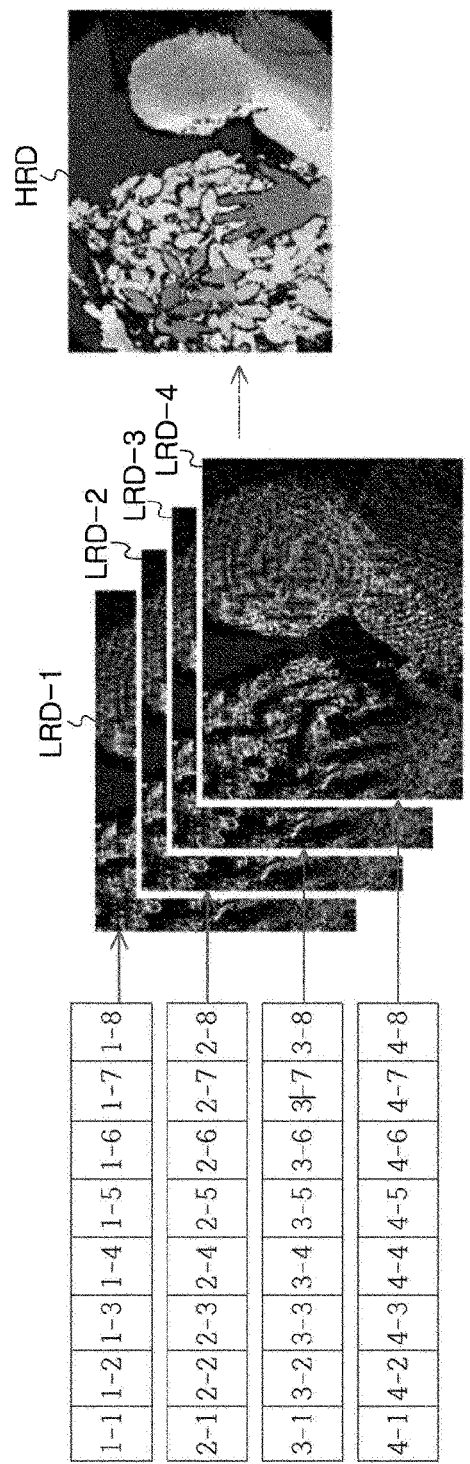

[FIG. 8]
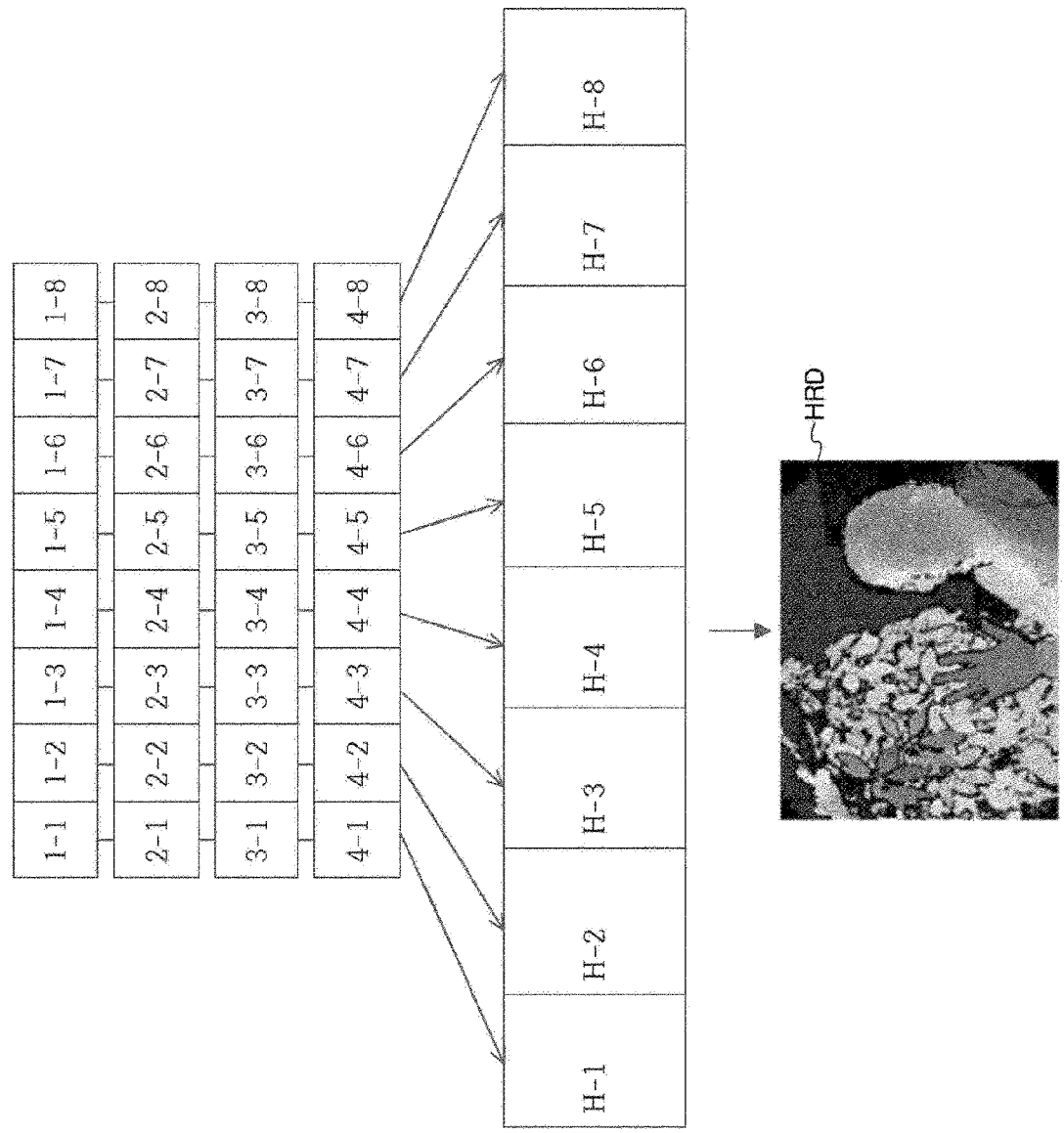

[FIG. 9]
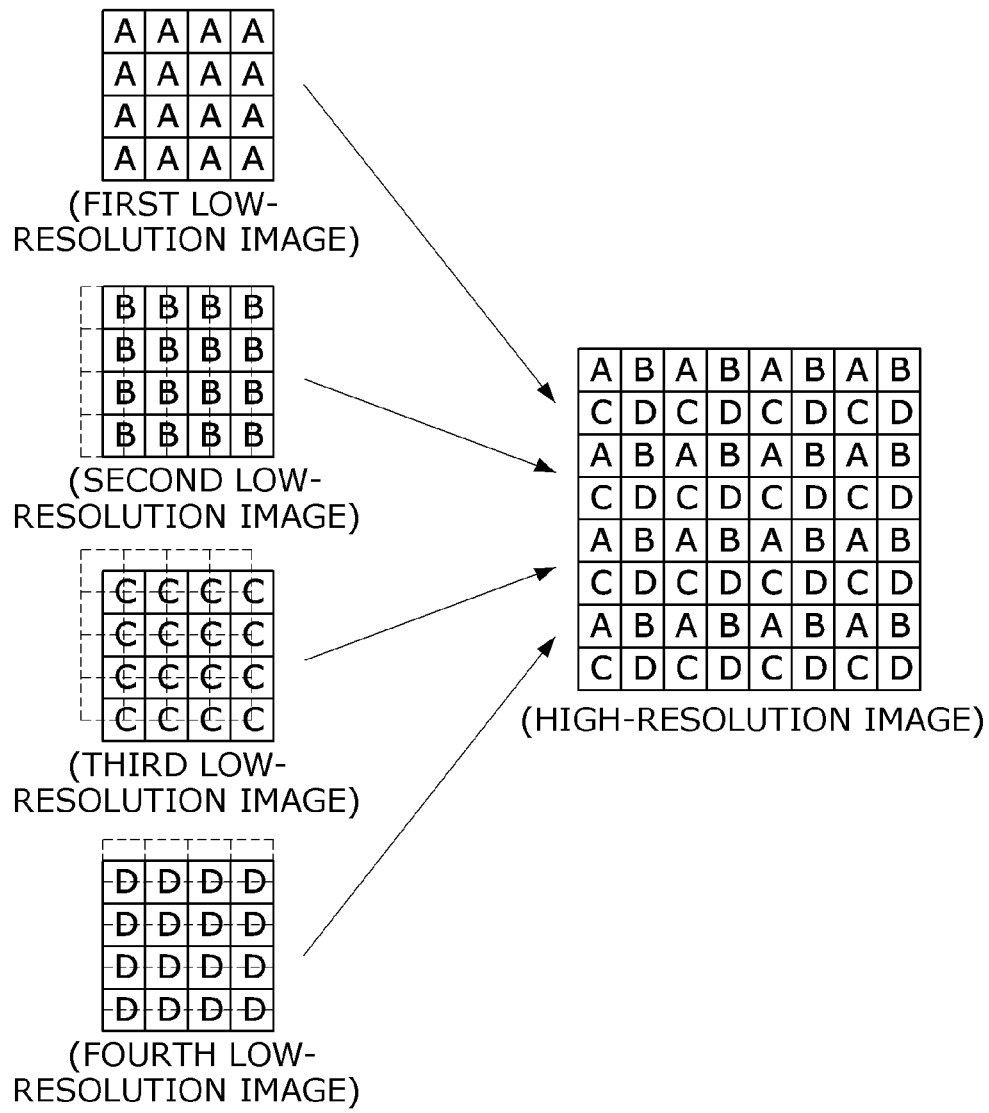

[FIG. 10]
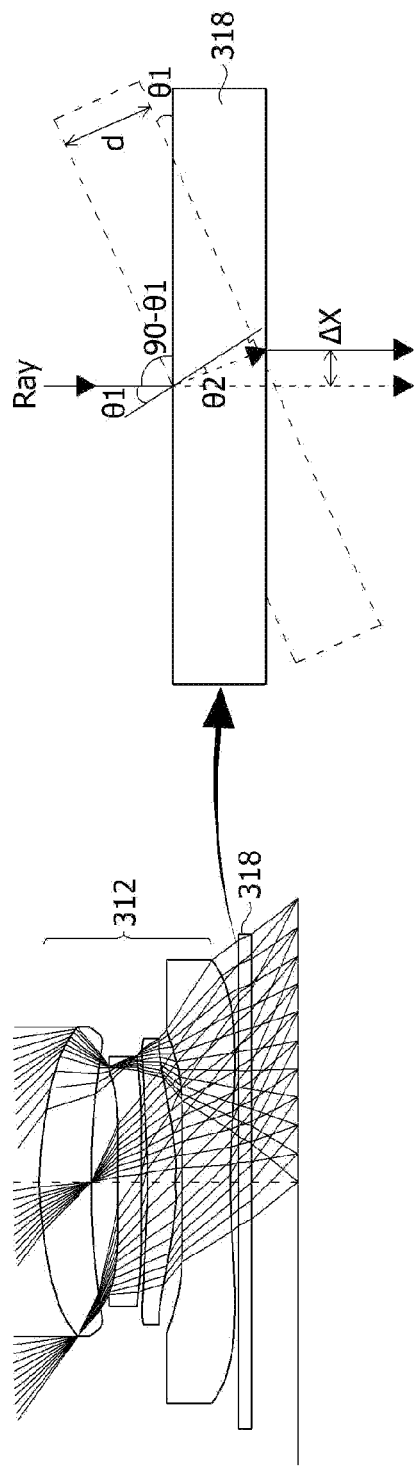

[FIG. 11]
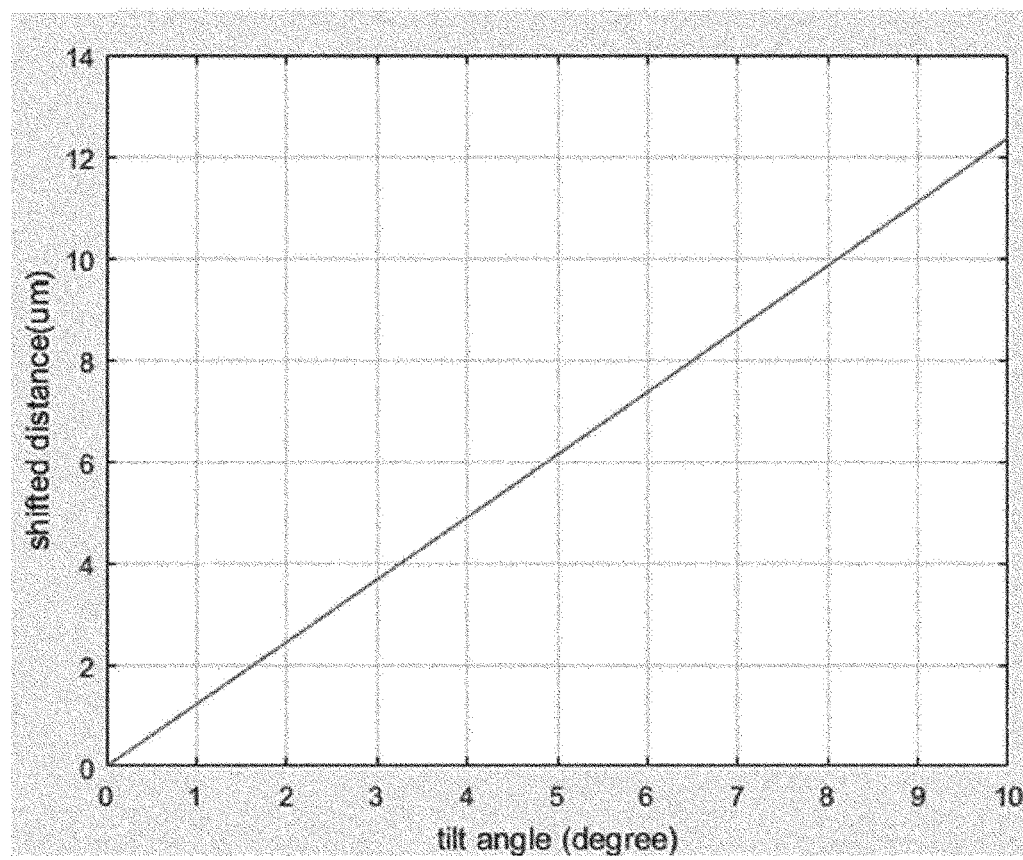

[FIG. 12]
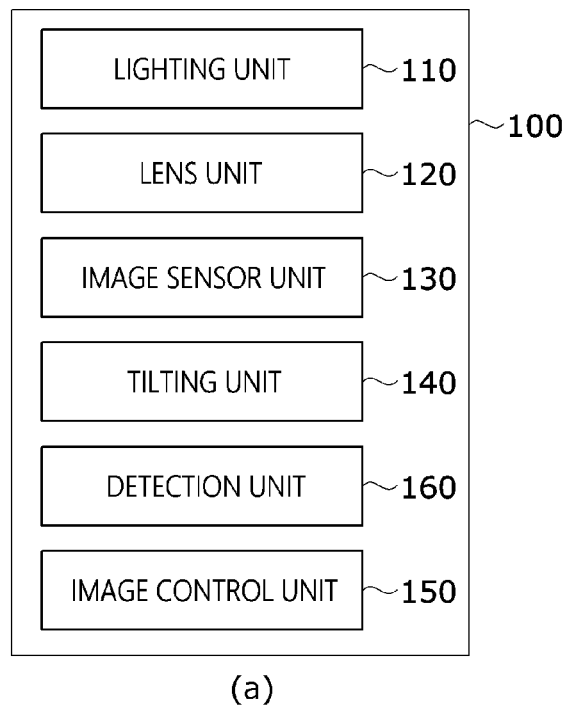
(a)
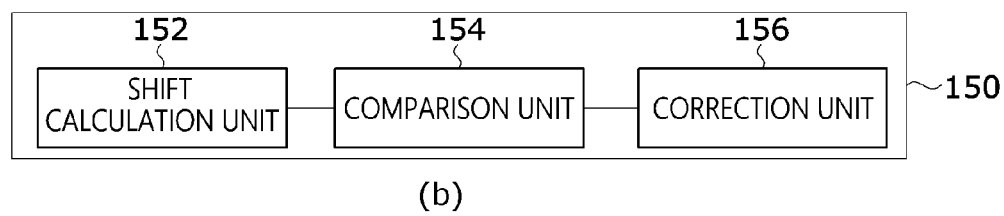
(b)

[FIG. 13]
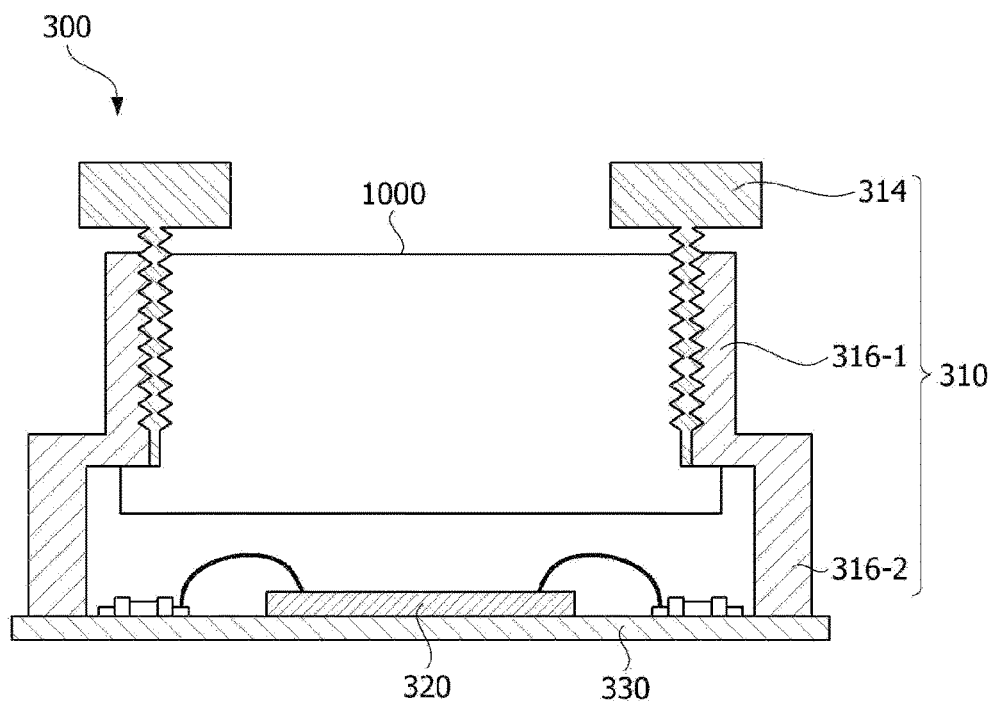
[FIG. 14]
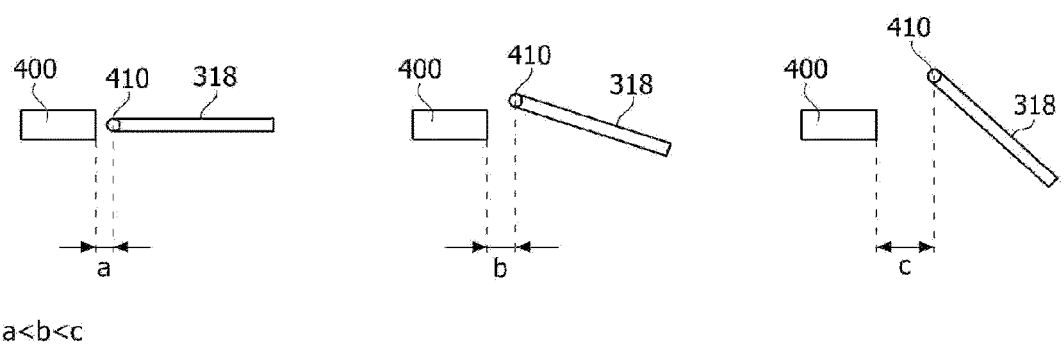
a<b<c

[FIG. 15]
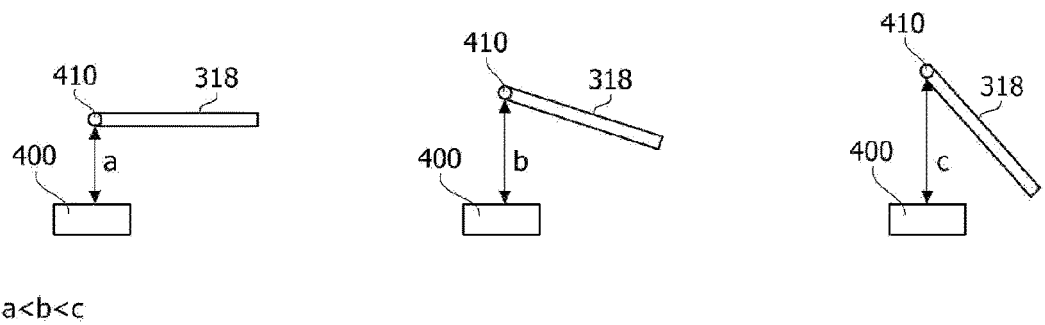
a<b<c

[FIG. 16]
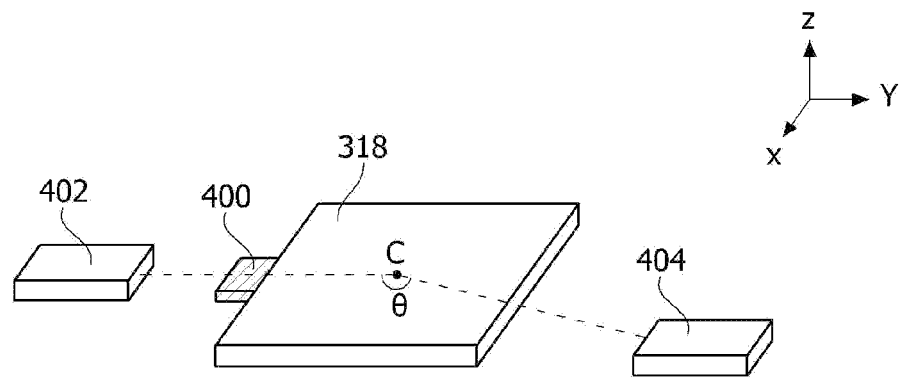
(a)
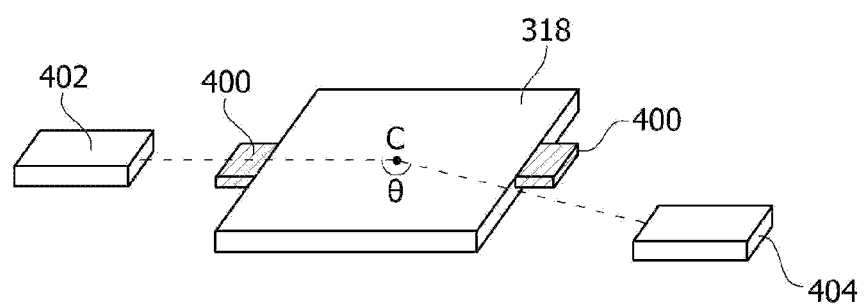
(b)
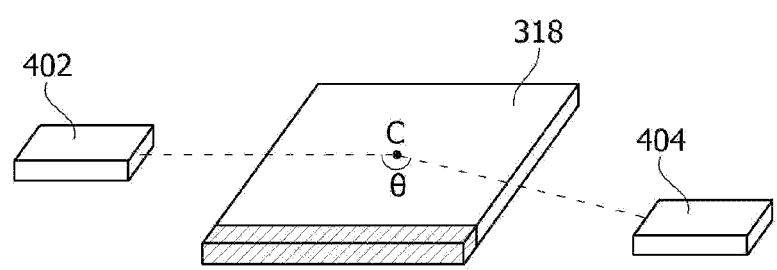
(c)

[FIG. 17]
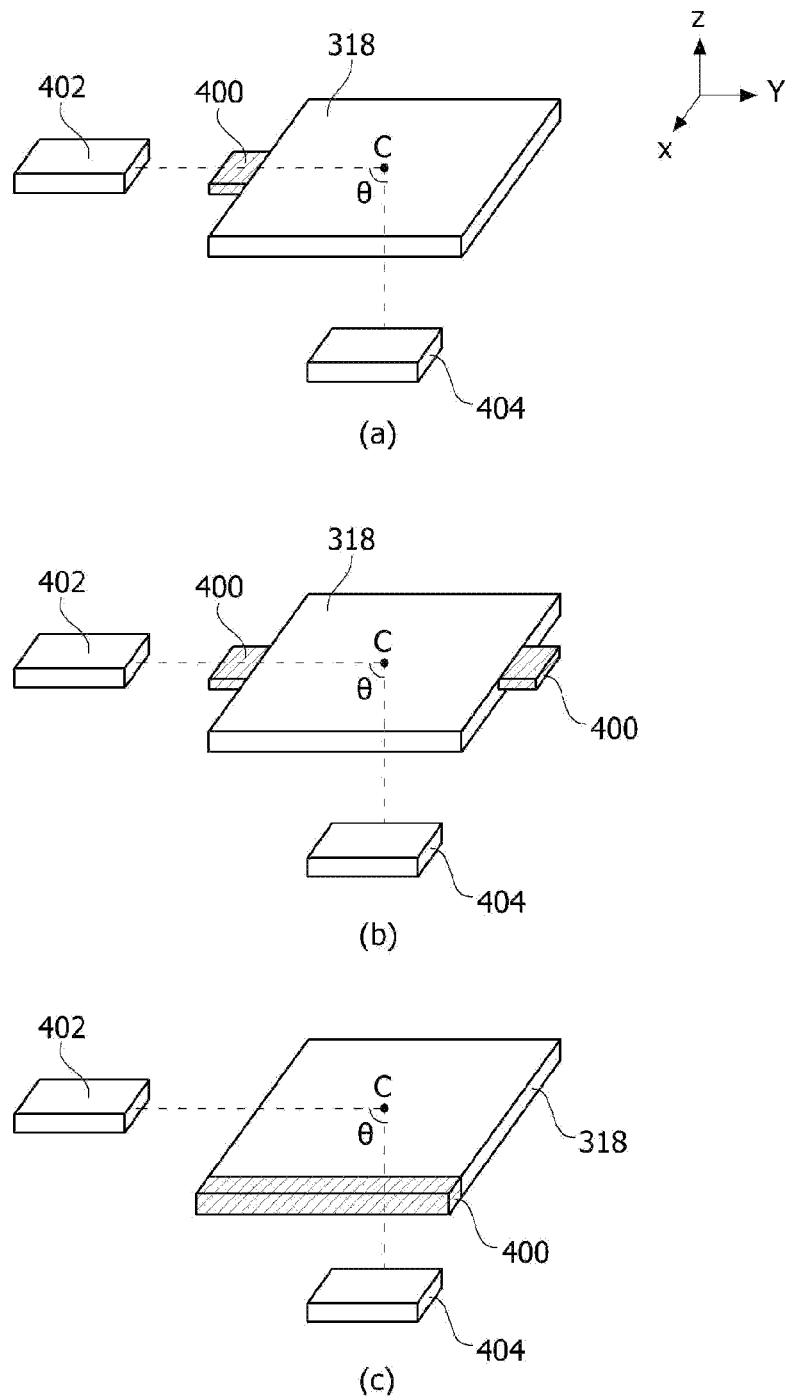

[FIG. 18]
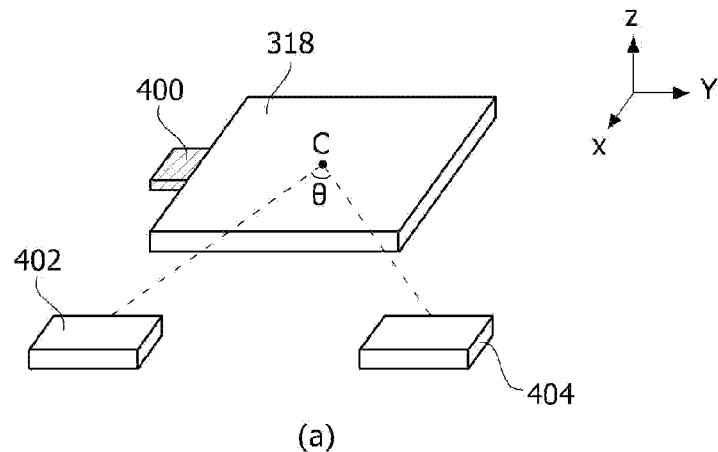
(a)
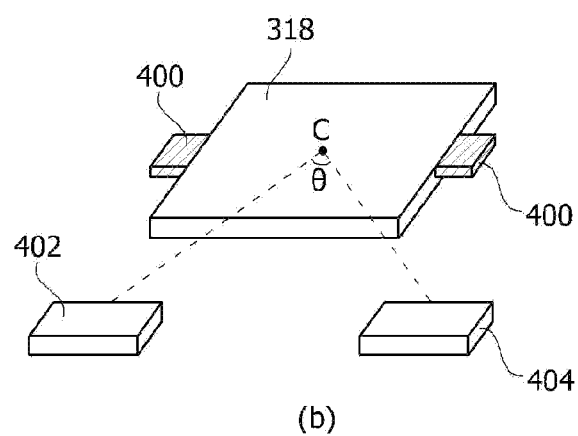
(b)
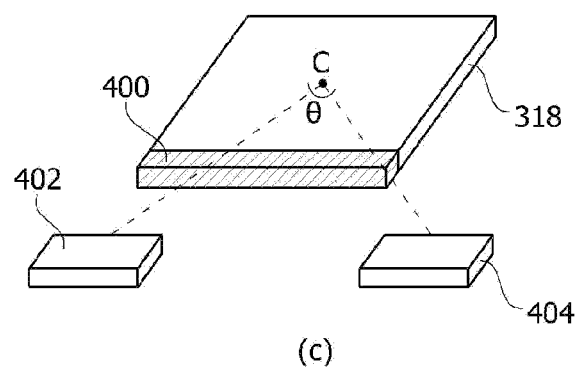
(c)

[FIG. 19]
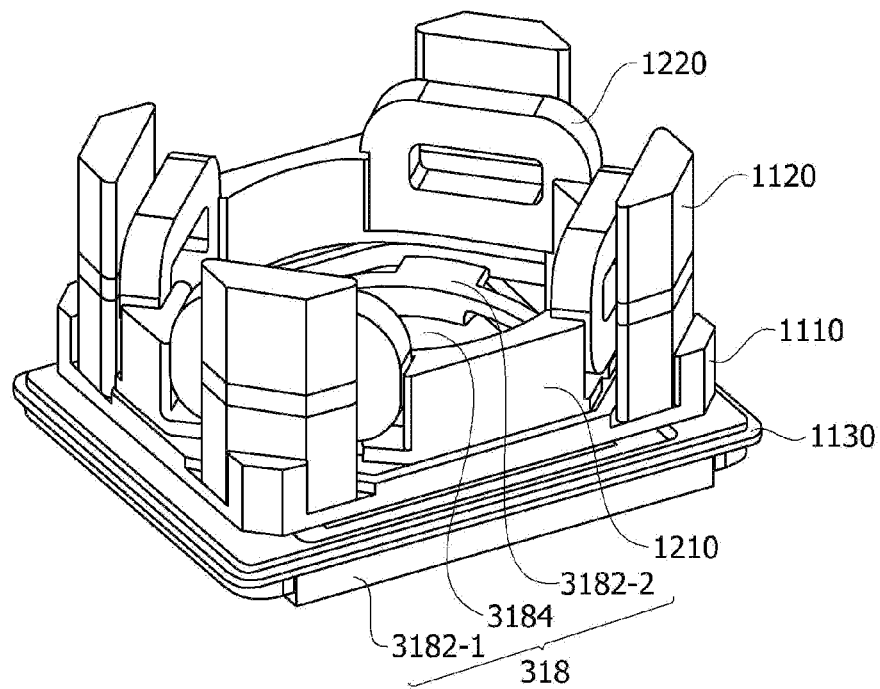
1000 ; 1110, 1120, 1130, 1210, 1220

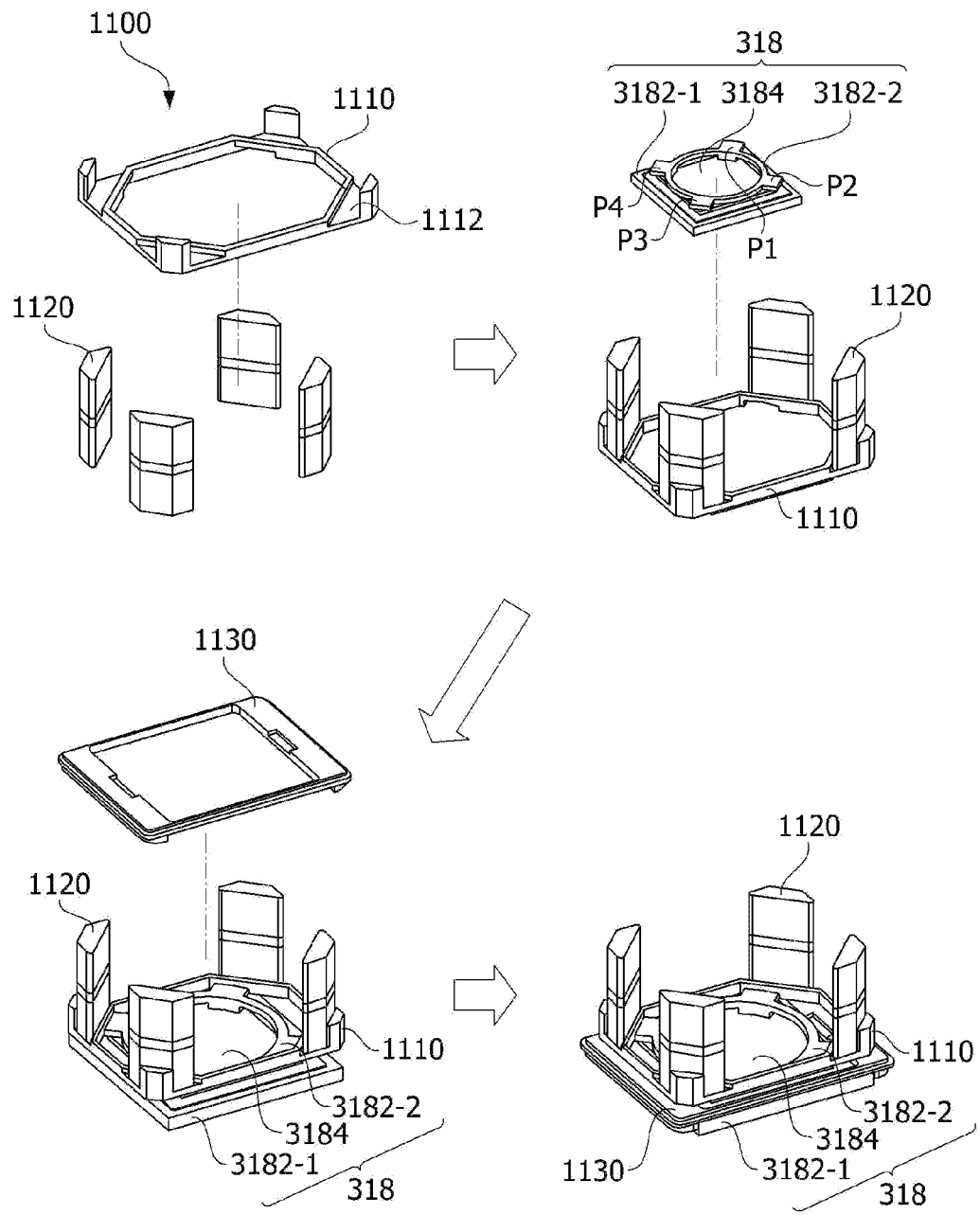
[FIG. 20]

[FIG. 21]
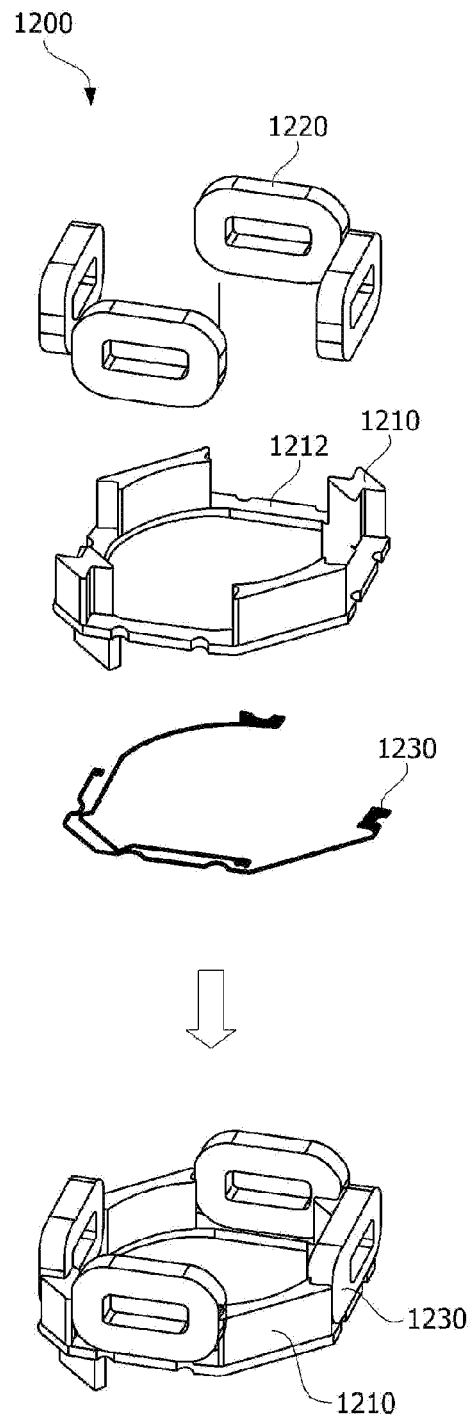

[FIG. 22]
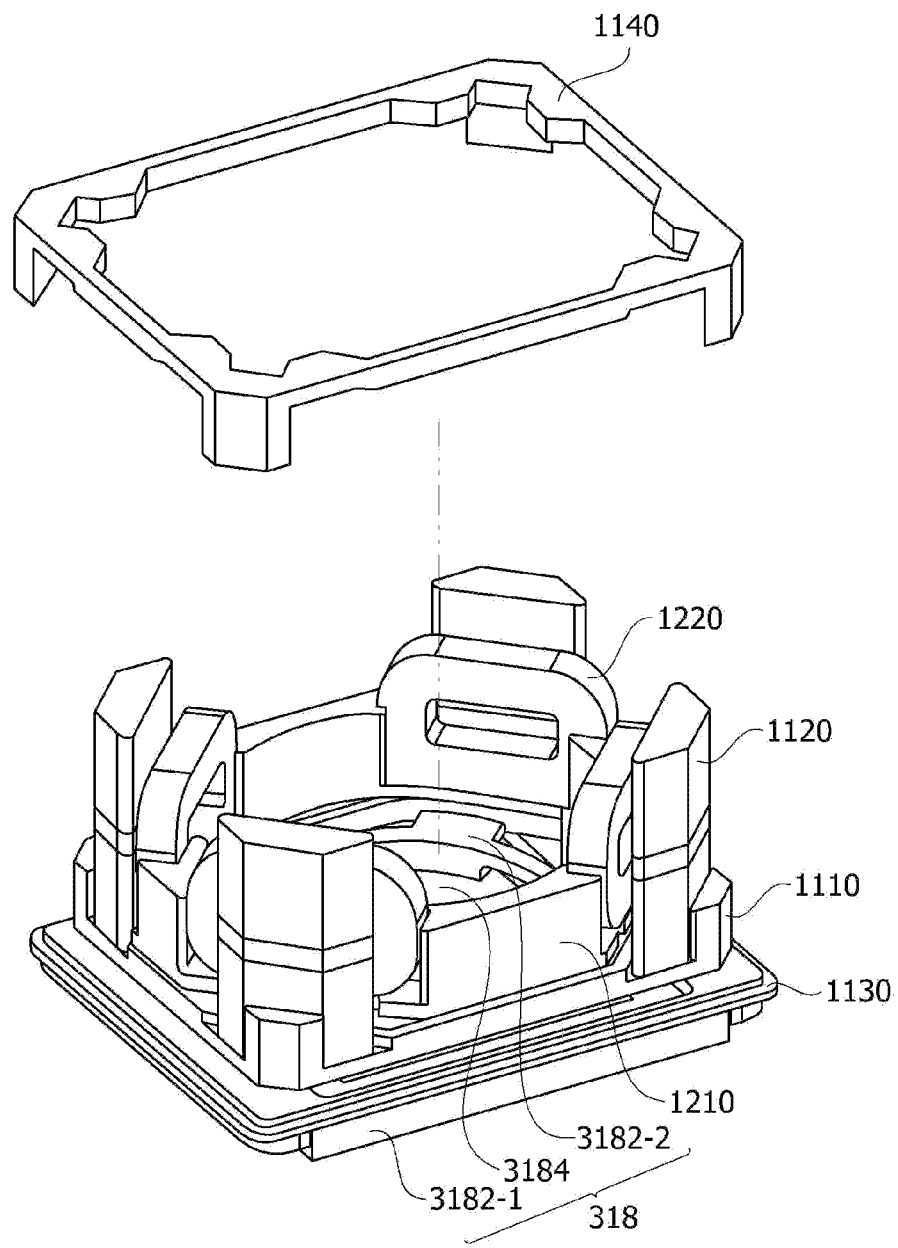

[FIG. 23]
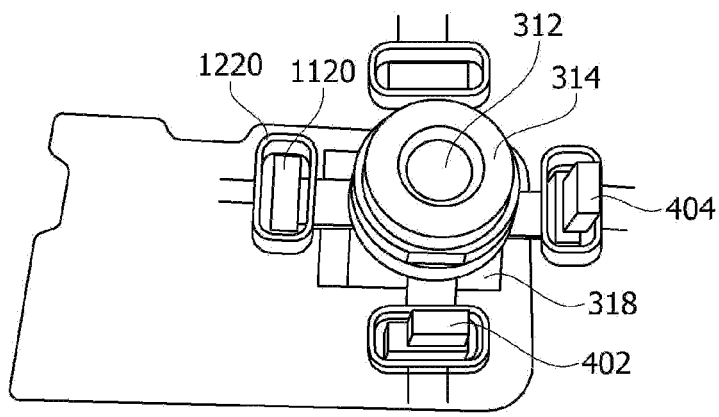
[FIG. 24]
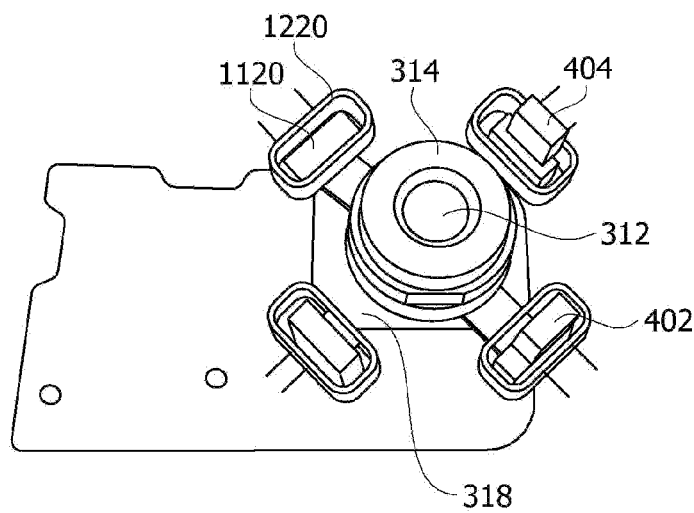

CAMERA MODULE AND DEPTH INFORMATION EXTRACTION METHOD THEREFOR

CROSS REFERENCE TO RELATED APPLICATIONS

This application is the National Phase of PCT International Application No. PCT/KR2019/006824, filed on Jun. 5, 2019, which claims priority under 35 U.S.C. 119(a) to Patent Application No. 10-2018-0065467, filed in the Republic of Korea on Jun. 7, 2018, all of which are hereby expressly incorporated by reference into the present application.

TECHNICAL FIELD

The present invention relates to a camera module and a method of extracting depth information using the same.

BACKGROUND ART

Three-dimensional (3D) content has been applied in various fields such as the fields of education, manufacturing, autonomous driving, and the like, as well as the fields of games and culture, and depth information (e.g., a depth map) is required to obtain 3D content. The depth information is information representing a spatial distance and a distance from one point on a two-dimensional (2D) image to another point.

As one of methods of obtaining depth information, there is a method of extracting depth information by projecting infrared (IR) structured light onto an object and analyzing light reflected from the object. The method using IR structured light is disadvantageous in that it is difficult to obtain a desired level of depth resolution with respect to a moving object.

A time-of-flight (ToF) method has drawn attention as a technology that may replace the method using IR structured light.

According to the ToF method, a distance to an object is calculated by measuring a flight time, i.e., a time for which emitted light is reflected. The greatest advantage of the ToF method is that information about a distance to a 3D space can be quickly provided in real time. In addition, users can obtain accurate distance information without additionally applying an algorithm or performing hardware correction. In addition, accurate depth information can be obtained even when a very close subject or a moving subject is measured.

However, the current ToF method has a problem in that information that can be obtained for each frame, that is, a resolution, is very low.

One way to increase the resolution is to increase the number of pixels of an image sensor. However, in this case, the volume and manufacturing costs of a camera module will greatly increase.

Accordingly, there is a need for a depth information obtaining method for increasing a resolution without significantly increasing the volume and manufacturing costs of a camera module.

DISCLOSURE

Technical Problem

The present invention is directed to providing a camera module for extracting depth information using the ToF method and a method of extracting depth information using the same.

Technical Solution

According to one aspect of the present invention, a camera module includes a lighting unit configured to output an output light signal to be emitted to an object; a lens unit configured to concentrate an input light signal reflected from the object, the lens unit including an infrared (IR) filter and at least one lens disposed on the IR filter; a tilting unit configured to control a tilt of the IR filter so as to shift an optical path of the input light signal; an image sensor unit configured to generate an electric signal from the input light signal concentrated by the lens unit and shifted by the tilting unit; an image control unit configured to extract depth information of the object using a phase difference between the output light signal and the input light signal, the input light signal being received by the image sensor unit; and a detection unit configured to detect tilt information of the IR filter and provide the tilt information of the IR filter to the image control unit.

The detection unit may include a first Hall sensor and a second Hall sensor to detect a position of a magnet moving integrally with the IR filter, and the first Hall sensor and the second Hall sensor may be arranged to form an angle of 90° or more and less than 180° with respect to a center of the IR filter.

The first Hall sensor and the second Hall sensor may be arranged at positions corresponding to outer sides of the IR filter to be respectively spaced apart from the magnet and the IR filter.

One of the first Hall sensor and the second Hall sensor may be arranged on a side of the IR filter to be spaced a certain distance from the magnet, and the other may be arranged at the bottom of the IR filter to be spaced a certain distance from the magnet.

The image control unit may include a shift calculation unit configured to calculate a shift value of the input light signal using the tilt information of the IR filter; a comparison unit configured to compare the shift value of the input light signal calculated by the shift calculation unit with a shift value stored in advance; and a correction unit configured to correct depth information of the object using the difference between the shift value of the input light signal and the shift value stored in advance, and the tilt information of the IR filter may be obtained by the first Hall sensor and the second Hall sensor.

The shift calculation unit may calculate tilt values of the IR filter when tilted in an X-axis direction, a Y-axis direction, and a Z-axis direction using information regarding the position of the magnet detected by the first Hall sensor and the second Hall sensor and calculate the shift value of the input light signal using the tilt values of the IR filter in the X-axis direction, the Y-axis direction, and the Z-axis direction.

The tilting unit may include at least one of micro electro mechanical systems (MEMS), a voice coil motor (VCM), and a piezoelectric element.

According to another aspect of the present invention, a method of extracting depth information by a camera module includes outputting, by a lighting unit, an output light signal to be emitted to an object; concentrating, by a lens unit, an input light signal reflected from the object; shifting, by a tilting unit, an optical path of the input light signal by controlling a tilt of an IR filter included in the lens unit; detecting tilt information of the IR filter by a detection unit; generating, by an image sensor, an electric signal from the concentrated and shifted input light signal; and extracting, by an image control unit, depth information of the object using a phase difference between the output light signal and the input light signal, which is received by the image sensor unit, and the tilt information of the IR filter detected by the detection unit.

The detecting of the tilt information of the IR filter may include detecting position information of a magnet moving integrally with the IR filter by a first Hall sensor and a second Hall sensor, which are arranged to form an angle of 90° or more and less than 180° with respect to a center of the IR filter.

The extracting of the depth information of the object may include calculating a shift value of the input light signal using tilt information of the IR filter detected using the position information of the magnet; comparing the shift value calculated in the calculating of the shift value of the input light signal with a value stored in advance; and correcting the depth information of the object using a difference between the calculated shift value and the value stored in advance.

The calculating of the shift value of the input light signal may include calculating tilt values of the IR filter when tilted in an X-axis direction, a Y-axis direction, and a Z-axis direction using information regarding the position of the magnet detected by the first Hall sensor and the second Hall sensor and calculating the shift value of the input light signal using the tilt values of the IR filter in the X-axis direction, the Y-axis direction, and the Z-axis direction.

Advantageous Effects

With a camera module according to an embodiment of the present invention, high-resolution depth information can be obtained without significantly increasing the number of pixels of an image sensor.

According to an embodiment of the present invention, a subpixel shift effect can be obtained using a simple structure.

Furthermore, according to an embodiment of the present invention, a degree of subpixel shifting can be detected finely and thus super-resolution depth information can be obtained.

DESCRIPTION OF DRAWINGS

FIG. 1 is a block diagram of a time-of-flight (ToF) camera module according to an embodiment of the present invention.

FIG. 2 is a diagram for describing a frequency of an incident light signal.

FIG. 3 illustrates an example of a cross-sectional view of a camera module.

FIG. 4 is a diagram for describing a process of generating an electric signal according to an embodiment of the present invention.

FIG. 5 is a diagram for describing an image sensor (130) according to an embodiment of the present invention.

FIG. 6 is a diagram for describing changing an optical path of a reflected light signal by a tilting unit (140).

FIGS. 7 and 8 are diagrams for describing a super-resolution (SR) technique according to an embodiment of the present invention.

FIG. 9 is a diagram for describing a pixel value arrangement process according to an embodiment of the present invention.

FIGS. 10 and 11 are diagrams for describing an effect of shifting an image frame input on an image sensor by controlling a tilt of an infrared (IR) filter.

FIG. 12 is a block diagram of a ToF camera module according to an embodiment of the present invention.

FIG. 13 is a cross-sectional view of a ToF camera module according to an embodiment of the present disclosure.

FIGS. 14 and 15 are diagrams illustrating a relationship between a tilt of an IR filter and a detection unit included in a ToF camera module according to an embodiment of the present invention.

FIGS. 16 to 18 illustrate various examples of an arrangement relationship between an IR filter and a detection unit included in a ToF camera module according to an embodiment of the present invention.

FIG. 19 is a perspective view of a voice coil motor (VCM) and an IR filter according to an embodiment of the present invention.

FIG. 20 is a diagram illustrating a process of combining a magnet assembly and an IR filter included in a VCM according to an embodiment of the present invention.

FIG. 21 is a diagram illustrating a process of combining a coil assembly included in a VCM according to an embodiment of the present invention.

FIG. 22 is a diagram illustrating a process of combining a magnet assembly, an IR filter, and a coil assembly according to an embodiment of the present invention.

FIGS. 23 and 24 illustrate concrete examples of a VCM and a Hall sensor.

MODES OF THE INVENTION

Various changes may be made in the present invention and various embodiments may be implemented, and thus, example embodiments are illustrated in the accompanying drawings and described herein. However, it should be understood that the present disclosure is not limited to particular embodiments and include all modifications, equivalents, and alternatives falling within the idea and scope of the present disclosure.

Terms, including ordinal numbers such as second and first, may be used to describe various components but these components should not be construed as being limited by the terms. The terms are only used to distinguish one component from another. For example, a second component may be referred to as a first component without departing from the scope of the present invention, and similarly, a first component may also be referred to as a second component. The term "and/or" includes a combination of a plurality of related items described herein or any one of the plurality of related items.

When a component is referred to as being "coupled to" or "connected" to another component, it should be understood that the component may be directly coupled to or connected to another component but still another component may be interposed therebetween. In contrast, when a component is referred to as being "directly coupled to" or "directly connected" to another component, it should be understood that no component is interposed therebetween.

The terms used in this application are only used to describe certain embodiments and are not intended to limit the present disclosure. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as ideal or excessively formal meanings unless explicitly defined in the present application.

Hereinafter, embodiments will be described in detail with reference to the accompanying drawings, but the same or corresponding components are assigned the same reference numbers even in different drawings and are not redundantly described herein.

FIG. 1 is a block diagram of a time-of-flight (ToF) camera module according to an embodiment of the present invention.

Referring to FIG. 1, a ToF camera module 100 includes a lighting unit 110, a lens unit 120, an image sensor unit 130, a tilting unit 140, and an image control unit 150.

The lighting unit 110 generates an output light signal and emits the output light signal to an object. In this case, the lighting unit 110 may generate and output the output light signal in the form of a pulse wave or continuous wave. The continuous wave may be in the form of a sinusoid wave or square wave. By generating the output light signal in the form of the pulse wave or continuous wave, the ToF camera module 100 may detect a phase difference between the output light signal output from the lighting unit 110 and an input light signal reflected from the object and input to the ToF camera module 100. In the present specification, output light may refer to light that is output from the lighting unit 110 and incident on an object, and input light may refer to light that is output from the lighting unit 110, reaches the object, is reflected from the object and thereafter is input to the ToF camera module 100. The output light may be understood as incident light and the input light may be understood as reflected light in terms of the object.

The lighting unit 110 emits the generated output light signal to the object for a certain integration time. Here, the integration time refers to one frame period. When a plurality of frames are generated, a set integration time may be repeated. For example, when an image of an object is captured by the ToF camera module 100 at 20 FPS, an integration time is ½₀ [sec]. When 100 frames are generated, the integration time may be repeated 100 times.

The lighting unit 110 may generate a plurality of output light signals having different frequencies. The lighting unit 110 may sequentially and repeatedly generate the plurality of output light signals having different frequencies. Alternatively, the lighting unit 110 may simultaneously generate the plurality of output light signals having different frequencies.

FIG. 2 is a diagram for describing a frequency of an output light signal. According to an embodiment of the present invention, the lighting unit 110 may control a first half of an integration time to generate an output light signal having a frequency $f_1$ and control the other half of the integration time to generate an output light signal having a frequency $f_2$, as illustrated in FIG. 2.

According to another embodiment, the lighting unit 110 may control some of a plurality of light-emitting diodes to generate an output light signal having a frequency $f_1$ and control the remaining light-emitting diodes to generate an output light signal having a frequency $f_2$.

To this end, the lighting unit 110 may include a light source 112 that generates light and a light modulator 114 that modulates light.

First, the light source 112 generates light. The light generated by the light source 112 may be an infrared ray having a wavelength of 770 to 3000 nm or visible light having a wavelength of 380 to 770 nm. The light source 112 may use light-emitting diodes (LEDs) and have a form in which a plurality of LEDs are arranged in a certain pattern. Alternatively, the light source 112 may include organic LEDs (OLEDs) or laser diodes (LDs).

The light source 112 blinks (is turned on/off) repeatedly at regular time intervals to generate an output light signal in the form of the pulse wave or continuous wave. The time intervals may be a frequency of the output light signal. The blinking of the light source 112 may be controlled by the light modulator 114.

The light modulator 114 controls the blinking of the light source 112 so that the light source 112 may generate an output light signal in the form of the pulse wave or continuous wave. The light modulator 114 may control the light source 112 to generate an output light signal in the form of the pulse wave or continuous wave through frequency modulation or pulse modulation.

The lens unit 120 concentrates an input light signal reflected from an object and transmits the concentrated input light signal to the image sensor unit 130.

FIG. 3 illustrates an example of a cross-sectional view of a camera module.

Referring to FIG. 3, a camera module 300 includes a lens assembly 310, an image sensor 320, and a printed circuit board 330. Here, the lens assembly 310 may correspond to the lens unit 120 of FIG. 1, and the image sensor 320 may correspond to the image sensor unit 130 of FIG. 1. The image control unit 150 of FIG. 1 and the like may be included in the printed circuit board 330. Although not shown, the lighting unit 110 of FIG. 1 may be disposed on the printed circuit board 330 and at a side of the image sensor 320 or may be disposed outside the camera module 300.

The lens assembly 310 may include a lens 312, a lens barrel 314, a lens holder 316, and an infrared (IR) filter 318.

A plurality of lenses 312 may be provided or one lens 312 may be provided. When the plurality of lenses 312 are provided, each of them may be aligned about a central axis to form an optical system. Here, the central axis may be the same as an optical axis of the optical system.

The lens barrel 314 may be coupled to the lens holder 316, and a space for accommodating a lens may be provided therein. The lens barrel 314 may be, for example, rotatably coupled to one or a plurality of lenses or may be coupled thereto in a different manner such as a method using an adhesive (e.g., an adhesive resin such as epoxy).

The lens holder 316 may be coupled to the lens barrel 314 to support the lens barrel 314 and may be coupled to the printed circuit board 330 on which the image sensor 320 is mounted. A space in which the IR filter 318 is attachable may be formed under the lens barrel 314 due to the lens holder 316. A helical pattern may be formed on an inner circumferential surface of the lens holder 316 and rotationally coupled to the lens barrel 314 having a helical pattern on an outer circumferential surface thereof. However, this is only an example, and the lens holder 316 and the lens barrel 314 may be coupled to each other through an adhesive or may be integrally formed.

The lens holder 316 may be divided into an upper holder 316-1 coupled to the lens barrel 314 and a lower holder 316-2 coupled to the printed circuit board 330 on which the image sensor 320 is mounted. The upper holder 316-1 and the lower holder 316-2 may be integrally formed, may be formed separately and fastened or combined with each other, or may be formed separately and spaced apart from each other. In this case, a diameter of the upper holder 316-1 may be smaller than a diameter of the lower holder 316-2.

The above description is only an embodiment, and the lens unit 120 may be configured in a different structure capable of concentrating an input light signal incident on the ToF camera module 100 and transmitting the concentrated input light signal to the image sensor unit 130.

Referring back to FIG. 1, the image sensor unit 130 generates an electric signal from the input light signal concentrated by the lens unit 120.

The image sensor unit 130 may absorb the input light signal in synchronization with a blinking period of the lighting unit 110. Specifically, the image sensor unit 130 may absorb light in phase or out of phase with the output light signal output from the lighting unit 110. That is, the image sensor unit 130 may repeatedly absorb an incident light signal when the light source is turned on and absorb an incident light signal when the light source is turned off.

Next, the image sensor unit 130 may generate electric signals corresponding to a plurality of reference signals having different phase differences from the plurality of reference signals. A frequency of the plurality of reference signals may be set to be the same as that of the output light signal output from the lighting unit 110. Accordingly, when the lighting unit 110 generates output light signals using a plurality of frequencies, the image sensor unit 130 generates electric signals using a plurality of reference signals corresponding to the plurality of frequencies. The electrical signal may include information regarding the amount of charges or a voltage corresponding to each of the plurality of reference signals.

FIG. 4 is a diagram for describing a process of generating an electric signal according to an embodiment of the present invention.

As illustrated in FIG. 4, four reference signals $C_1$ to $C_4$ may be provided according to an embodiment of the present invention. The reference signals $C_1$ to $C_4$ may have the same frequency as an output light signal and have a phase difference of 90 degrees from each other. The reference signal $C_1$ which is one of the four reference signals $C_1$ to $C_4$ may have the same phase as the output light signal. A phase of an input light signal is delayed by a distance by which the output light signal incident on an object is reflected back. The image sensor unit 130 mixes the input light signal with each of the reference signals. Therefore, the image sensor unit 130 may generate an electric signal corresponding to one of shaded portions of FIG. 4 for each of the reference signals.

In another embodiment, when output light signals are generated at a plurality of frequencies for an exposure time, the image sensor unit 130 absorbs input light signals according to the plurality of frequencies. For example, it is assumed that output light signals are generated at frequencies $f_1$ and $f_2$ and a plurality of reference signals have a phase difference of 90 degrees. Therefore, incident light signals also have the frequencies $f_1$ and $f_2$ and thus four electric signals may be generated from the input light signal having the frequency $f_1$ and four reference signals corresponding thereto. In addition, four electrical signals may be generated from the input light signal having the frequency $f_2$ and four reference signals corresponding thereto. Thus, a total of eight electrical signals may be generated.

The image sensor unit 130 may be configured in a structure in which a plurality of pixels are arranged in a grid form. The image sensor unit 130 may be a complementary metal oxide semiconductor (CMOS) image sensor or a charge-coupled device (CCD) image sensor. In addition, the image sensor unit 130 may include a ToF sensor that receives IR light reflected from a subject and measures the distance to the object using a time or phase difference.

FIG. 5 is a diagram for describing the image sensor unit 130 according to an embodiment of the present invention. For example, as illustrated in FIG. 5, in the case of the image sensor unit 130 having a resolution of 320×240, 76,800 pixels are arranged in a grid form. In this case, a certain gap may be formed between a plurality of pixels, as shaded in FIG. 5. In one embodiment of the present invention, a pixel and the certain gap adjacent thereto will be described together as one pixel.

According to an embodiment of the present invention, each pixel 132 may include a first light receiving unit 132-1 including a first photodiode and a first transistor and a second light receiving unit 132-2 including a second photodiode and a second transistor.

The first light receiving unit 132-1 receives an input light signal at the same phase as a waveform of output light. That is, when a light source is turned on, the first photodiode is turned on and absorbs the input light signal. When the light source is turned off, the first photodiode is turned off and the absorbing of the input light signal stops. The first photodiode converts the absorbed input light signal into a current and transmits the current to the first transistor. The first transistor converts the current into an electric signal and outputs the electric signal.

The second light receiving unit 132-2 receives an input light signal in a phase opposite to the waveform of the output light. That is, when the light source is turned on, the second photodiode is turned off and absorbs the input light signal. When the light source is turned off, the second photodiode is turned on and the absorbing of the input light signal stops. The second photodiode converts the absorbed input light signal into a current and transfers the current to the second transistor. The second transistor converts the current into an electric signal.

Accordingly, the first light receiving unit 132-1 may be referred to as an in-phase receiving unit, and the second light receiving unit 132-2 may be referred to as an out-phase receiving unit. As such, when the first light receiving unit 132-1 and the second light receiving unit 132-2 are activated with a time difference, the amount of received light varies according to the distance to the object. For example, when the object is in front of the ToF camera module 100 (i.e., the distance=0), a time for which light output from the lighting unit 110 is reflected from the object is 0 and thus a blinking period of the light source may be the same as a light reception period. Accordingly, only the first light receiving unit 132-1 receives light and the second light receiving unit 132-2 cannot receive light. As another example, when the object is spaced a certain distance from the ToF camera module 100, it takes time to receive light reflected back from the object after the light is output from the lighting unit 110 and thus a blinking period of the light source is different from a light reception period. Accordingly, the amount of light received by the first light receiving unit 132-1 and the amount of light received by the second light receiving unit 132-2 are different. That is, the distance to the object may be calculated using the difference between the amount of light input to the first light receiving unit 132-1 and the amount of light input to the second light receiving unit 132-2. Referring back to FIG. 1, the image control unit 150 calculates the phase difference between output light and input light using an electric signal received from the image sensor unit 130 and calculates the distance between the object and the ToF camera module 100 using the phase difference.

Specifically, the image control unit 150 may calculate the phase difference between the output light and the input light using information regarding the amount of charges of the electric signal.

As described above, four electrical signals may be generated at a frequency of each output light signal. Accordingly, the image control unit 150 may calculate a phase difference $t_d$ between the output light signal and the input light signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ represent the amounts of charges of four electric signals. $Q_1$ represents the amount of changes of an electric signal corresponding to a reference signal having the same phase as an output light signal. $Q_2$ represents the amount of charges of an electric signal corresponding to a reference signal which is 180 degrees out of phase with the output light signal. $Q_3$ represents the amount of charges of an electric signal corresponding to a reference signal which is 90 degrees out of phase with the output light signal. $Q_4$ represents the amount of charges of an electric signal corresponding to a reference signal which is 270 degrees out of phase with the output light signal.

Therefore, the image control unit 150 may calculate the distance between the object and the ToF camera module 100 using the phase difference between the output light signal and the input light signal. In this case, the image control unit 150 may calculate the distance d between the object and the ToF camera module 100 using Equation 2 below.

$$d = \frac{c}{2f} \frac{t_d}{2\pi} \quad \text{[Equation 2]}$$

Here, c represents the speed of light and f represents a frequency of output light.

In one embodiment of the present invention, a super-resolution (SR) technique is used to increase a resolution of depth information. The SR technique is a technique for obtaining a high-resolution image from a plurality of low-resolution images, and a mathematical model of the SR technique may be expressed by Equation 3 below.

$$y_k = D_k B_k M_k x + n_k \quad \text{[Equation 3]}$$

Here, $1 \leq k \leq p$, p represents the number of low-resolution images, $y_k$ represents low-resolution images ($=[y_{k,1}, y_{k,2}, \ldots, y_{k,M}]^T$, here, $M = N_1 * N_2$), $D_k$ represents a downsampling matrix, $B_k$ represents an optical blur matrix, $M_k$ represents an image warping matrix, x represents high-resolution images ($=[x_1, x_2, \ldots, x_N]^T$, here, $N = L_1 N_1 * L_2 N_2$), and $n_k$ represents noise. That is, the SR technique refers to a technique for estimating x by applying an inverse function of resolution degradation elements estimated from $y_k$. The SR technique may be largely divided into a statistical method and a multi-frame method, and the multi-frame method may be largely divided into a space division method and a time division method. When the SR technique is used to obtain depth information, the statistical method may be attempted because an inverse function of $M_k$ of Equation 1 does not exist. However, in the case of the statistical method, an iterative calculation process is required and thus efficiency is low.

In order to apply the SR technique to extract depth information, the image control unit 150 generates a plurality of low-resolution subframes using an electric signal received from the image sensor unit 130 and extracts a plurality of pieces of low-resolution depth information using the plurality of low-resolution subframes. In addition, high-resolution depth information may be extracted by rearranging pixel values of the plurality of pieces of low-resolution depth information.

Here, the "high resolution" has a relative meaning of a resolution higher than a low resolution.

Here, the "subframe" may refer to image data generated from an electrical signal corresponding to an integration time and a reference signal. For example, when an electrical signal is generated from eight reference signals in a first integration time, i.e., one image frame, eight subframes may be generated and a start-of-frame may further be generated. In the present specification, the term "subframe" may be interchangeably used with image data, subframe image data, or the like.

Alternatively, in order to apply the SR technique according to an embodiment of the present invention to extract depth information, the image control unit 150 may generate a plurality of low-resolution subframes from an electric signal received from the image sensor unit 130 and generate a plurality of high-resolution subframes by rearranging pixel values of the plurality of low-resolution subframes. In addition, high-resolution depth information may be extracted from the plurality of high-resolution subframes.

To this end, a pixel shift technique may be used. That is, after obtaining several pieces of image data shifted by sub-pixels for each subframe using the pixel shift technology, a plurality of pieces of high-resolution subframe image data are obtained by applying the SR technique to each subframe and depth information may be extracted using the plurality of pieces of high-resolution subframe image data. For pixel shifting, the ToF camera module 100 according to an embodiment of the present invention includes the tilting unit 140.

Referring back to FIG. 1, the tilting unit 140 changes at least one optical path of an output light signal or an input light signal in units of subpixels of the image sensor unit 130.

The tilting unit 140 changes at least one optical path of an output light signal or an input light signal for each image frame. As described above, one image frame may be generated per integration time. Accordingly, when one integration time ends, the tilting unit 140 changes at least one optical path of the output light signal or the input light signal.

The tilting unit 140 changes at least one optical path of the output light signal or the input light signal by a subpixel unit with respect to the image sensor unit 130. In this case, the tilting unit 140 changes at least one optical path of the output light signal or the input light signal to an up, down, left or right direction with respect to a current optical path.

FIG. 6 is a diagram for describing changing an optical path of an input light signal by the tilting unit 140.

In FIG. 6A, solid lines represent a current optical path of an input light signal and broken lines represent a changed optical path. When an integration time corresponding to the current optical path ends, the tilting unit 140 may change an optical path of the input light signal as indicated by broken lines. Then, the current optical path of the input light signal is shifted by a subpixel. For example, as illustrated in FIG. 6A, when the tilting unit 140 moves the current optical path to the right by 0.173 degrees, an input light signal incident on the image sensor unit 130 may be moved to the right by 0.5 pixels (subpixels).

According to an embodiment of the present invention, the tilting unit 140 may change the optical path of the input light signal clockwise from a reference position. For example, as illustrated in FIG. 6B, after a first integration time ends, the tilting unit 140 moves the optical path of the input light signal by 0.5 pixels to the right with respect to the image sensor unit 130 at a second integration time. Next, the tilting unit 140 moves the optical path of the input light signal downward by 0.5 pixels with respect to the image sensor unit 130 at a third integration time. Next, the tilting unit 140 moves the optical path of the input light signal by 0.5 pixels to the left with respect to the image sensor unit 130 at a fourth integration time. Thereafter, the tilting unit 140 moves the optical path of the input light signal upward by 0.5 pixels with respect to the image sensor unit 130 at a fifth integration time. That is, the tilting unit 140 may move the optical path of the input light signal to the original position according to the four integration times. This may also apply to moving an optical path of an output light signal and a detailed description thereof will be omitted. A pattern in which the optical path is changed in a clockwise direction is only an example and the optical path may be changed in a counterclockwise direction.

Each subpixel may be larger than zero pixels and smaller than one pixel. For example, a size of each subpixel may be a 0.5 pixel size or a ⅓ pixel size. The size of the subpixel may be designed and changed by those of ordinary skill in the art.

FIGS. 7 and 8 are diagrams for describing the SR technique according to an embodiment of the present invention.

Referring to FIG. 7, the image control unit 150 may extract a plurality of pieces of low-resolution depth information using a plurality of low-resolution subframes generated at the same integration time, i.e., the same frame. In addition, the image control unit 150 may extract high-resolution depth information by rearranging pixel values of the plurality of pieces low-resolution depth information. Here, optical paths of output light signals or input light signals corresponding to the plurality of pieces of low-resolution depth information may be different from each other.

For example, the image control unit 150 may generate low-resolution subframes 1-1 to 4-8 using a plurality of electric signals. The low-resolution subframes 1-1 to 1-8 are low-resolution subframes generated at a first integration time. The low-resolution subframes 2-1 to 2-8 are low-resolution subframes generated at a second integration time. The low-resolution subframes 3-1 to 3-8 are low-resolution subframes generated at a third integration time. The low-resolution subframes 4-1 to 4-8 are low-resolution subframes generated at a fourth integration time. Thereafter, the image control unit 150 extracts low-resolution depth information LRD-1 to LRD-4 by applying a depth information extraction technique to the plurality of low-resolution subframes generated at each of the integration times. The low-resolution depth information LRD-1 is low-resolution depth information extracted using the subframes 1-1 to 1-8. The low-resolution depth information LRD-2 is low-resolution depth information extracted using the subframes 2-1 to 2-8. The low-resolution depth information LRD-3 is low-resolution depth information extracted using the subframes 3-1 to 3-8. The low-resolution depth information LRD-4 is low-resolution depth information extracted using the subframes 4-1 to 4-8. Thereafter, the image control unit 150 rearranges pixel values of the low-resolution depth information LRD-1 to LRD-4 to extract high-resolution depth information HRD.

Alternatively, as described above, the image control unit 150 may generate a high resolution subframe by rearranging pixel values of a plurality of subframes corresponding to the same reference signal. In this case, optical paths of output light signals or input light signals corresponding to the plurality of subframes are different. In addition, the image control unit 150 may extract high-resolution depth information using a plurality of high-resolution subframes.

For example, referring to FIG. 8, the image control unit 150 generates the low-resolution subframes 1-1 to 4-8 using a plurality of electric signals. The low-resolution subframes 1-1 to 1-8 are low-resolution subframes generated at a first integration time. The low-resolution subframes 2-1 to 2-8 are low-resolution subframes generated at a second integration time. The low-resolution subframes 3-1 to 3-8 are low-resolution subframes generated at a third integration time. The low-resolution subframes 4-1 to 4-8 are low-resolution subframes generated at a fourth integration time. Here, the low-resolution subframes 1-1, 2-1, 3-1, and 4-1 correspond to the same reference signal $C_1$ but correspond to different optical paths. Thereafter, the image control unit 150 may generate a high-resolution subframe H-1 by rearranging pixel values of the low-resolution subframes 1-1, 2-1, 3-1, and 4-1. When high-resolution subframes H-1 to H-8 are generated through pixel-value rearrangement, the image control unit 150 may extract high-resolution depth information HRD by applying the depth information extraction technique to the high-resolution subframes H-1 to H-8.

FIG. 9 is a diagram for describing a pixel value arrangement process according to an embodiment of the present invention.

Here, it is assumed that one 8×8 high-resolution image is generated using four 4×4 low-resolution images. In this case, a high-resolution pixel grid includes 8×8 pixels which are the same as pixels of the high-resolution image. Here, the low-resolution image may be understood as including low-resolution subframes and low-resolution depth information, and the high-resolution image may be understood as including high-resolution subframes and a high-resolution depth information.

In FIG. 9, first to fourth low-resolution images are images captured by moving an optical path in units of sub-pixels having a size of 0.5 pixels. The image control unit 150 arranges pixel values of the second to fourth low-resolution images according to a direction to which the optical path is moved with respect to the first low-resolution image, the optical path of which is not moved, according to the high-resolution image.

Specifically, the second low-resolution image is an image shifted to the right by subpixels from the first low-resolution image. Therefore, a pixel B of the second low-resolution image is located on a pixel located to the right of each pixel A of the first low-resolution image.

The third low-resolution image is an image moved downward by subpixels from the second low-resolution image. Therefore, a pixel C of the third low-resolution image is located on a pixel located under each pixel B of the second low-resolution image.

The fourth low-resolution image is an image shifted to the left by subpixels from the third low-resolution image. Therefore, a pixel D of the fourth low-resolution image is located on a pixel located to the left of each pixel C of the third low-resolution image.

When all the pixel values of the first to fourth low-resolution images are rearranged in the high-resolution pixel grid, a high-resolution image frame with a resolution of 4 times higher than that of the low-resolution images is generated.

The image control unit 150 may apply a weight to the arranged pixel values. In this case, the weight may be set differently according to the size of a subpixel or the moving direction of the optical path and may be set differently for each low-resolution image.

To this end, the tilting unit 140 may change the optical path in a software or hardware manner. When the optical path is to be changed by the tilting unit 140 in the software manner, the amount of calculation by the ToF camera module 100 may increase, and when the optical path is to be changed by the tilting unit 149 in the hardware manner, the structure of the ToF camera module 100 may be complicated or the volume thereof may be increased.

According to an embodiment of the present invention, the tilting unit 140 shifts an input light signal to obtain data shifted by subpixels by controlling a tilt of the lens assembly, e.g., a tilt of the IR filter 318 of FIG. 2 included in the lens assembly.

FIGS. 10 and 11 are diagrams for describing an effect of shifting an image frame input on an image sensor by controlling a tilt of an IR filter. FIG. 11 illustrates a simulation result of a shift distance with respect to a tilting angle under a condition that the IR filter has a thickness of 0.21 mm and a refractive index of 1.5.

Referring to FIG. 10 and Equation 4 below, the relationship between a tilt θ1 of the IR filter 318 and the shift distance may be expressed by:

$$\Delta x = d\cos\theta_1 \left( \frac{1}{\tan(90° - \theta_1)} - \frac{1}{\tan(90° - \theta_2)} \right) \quad \text{[Equation 4]}$$

Here, $\theta_2$ may be expressed by Equation 5 below.

$$\theta_2 = \sin^{-1}\left(\frac{\sin\theta_1}{n_g}\right) \quad \text{[Equation 5]}$$

$\theta_1$ represents the tilt of the filter 318, i.e., a tilting angle, $n_g$ represents the refractive index of the IR filter 318, and d represents the thickness of the IR filter 318. For example, referring to FIGS. 4 and 5, the IR filter 318 may be tilted at about 5° or 6° to shift an image frame input to the image sensor 320 by 7 μm. In this case, a vertical displacement of the IR filter 318 may be about 175 to 210 μm.

As described above, by controlling the tilt of the IR filter 318, shifted image data may be obtained without tilting the image sensor 320.

According to an embodiment of the present invention, a tilting unit for controlling a tilt of an IR filter may include an actuator to be directly or indirectly connected to the IR filter, and the actuator may include at least one among a Micro-Electro Mechanical Systems (MEMS), a Voice Coil Motor (VCM) and a piezoelectric element.

In this case, as described above, the size of a subpixel is larger than zero pixels and smaller than one pixel, and very precise control is required to shift the subpixel within such a range. When the IR filter is tilted using an actuator, a tilt of the tilted IR filter and a subpixel shift value of an input light signal may be different from a preset value according to the accuracy of the actuator. In particular, when an error or a failure occurs during operation of the actuator or when components are misaligned to each other due to the overage of the actuator, errors in the tilt of the IR filter and the subpixel shift value of the input light signal may become very large.

According to an embodiment of the present invention, the tilt of the IR filter is controlled using a tilting unit, tilt information of the IR filter is detected using a detection unit, and the detected tilt information is provided to the image control unit to be used for extracting depth information of an object.

FIG. 12 is a block diagram of a ToF camera module according to an embodiment of the present invention. FIG. 13 is a cross-sectional view of a ToF camera module according to an embodiment of the present disclosure. FIGS. 14 and 15 are diagrams illustrating a relationship between a tilt of an IR filter and a detection unit included in a ToF camera module according to an embodiment of the present invention. FIGS. 16 to 18 illustrate various examples of an arrangement relationship between an IR filter and a detection unit included in a ToF camera module according to an embodiment of the present invention.

Referring to FIG. 12, a ToF camera module 100 includes a lighting unit 110, a lens unit 120, an image sensor unit 130, a tilting unit 140, and an image control unit 150. A description of parts of FIG. 12 that are the same as those described above with reference to FIG. 1 are not be redundantly described here.

According to an embodiment of the present invention, a ToF camera module 100 further includes a detection unit 160 for detecting tilt information of an IR filter. The detection unit 160 converts the detected tilt information of the IR filter to an image control unit 150, and the image control unit 150 extracts depth information of an object by additionally using the tilt information detected by the detection unit 160.

To this end, the image control unit 150 may include a shift calculation unit 152, a comparison unit 154, and a correction unit 156. The shift calculation unit 152 may calculate an actual shift value of an input light signal using the tilt information of the IR filter detected by the detection unit 160. The comparison unit 154 may compare the shift value of the input light signal calculated by the shift calculation unit 152 with a preset and stored shift value. The correction unit 156 may correct depth information of an object using a result of the comparison performed by the comparison unit 154, e.g., the difference between the actual shift value of the input light signal calculated by the shift calculation unit 152 and the preset and stored shift value.

For example, when a value calculated by the shift calculation unit 152 is 0.6 pixels and a preset and stored sub-pixel shift value of the input light signal is 0.5 pixels, the correction unit 156 of the image control unit 150 may correct the depth information of the object by reflecting 0.1 pixels which is a difference between the calculated shift value of the input light signal and the preset and stored shift value.

To this end, referring to FIG. 13, a lens 312, an IR filter 318, a tilting unit 140, and a detection unit 160 may be disposed in a component assigned reference numeral 1000. A description of parts that are the same as those described above with reference to FIG. 3 will not be redundantly described below.

More specifically, referring to FIGS. 14 and 15, the detection unit 160 includes a Hall sensor 400, and tilt information of the IR filter may be obtained by the Hall sensor 400. That is, the Hall sensor 400 is disposed at a position corresponding to an outer surface of the IR filter to be spaced apart from the magnet 410 and the IR filter, and thus a position of the magnet 410 moving integrally with the IR filter 318 may be detected and the tilt information of the IR filter 318 may be detected according to the position of the magnet 410. In this specification, the tilt information of the IR filter 318 may include position information of the magnet 410 moving integrally with the IR filter 318 or information about the distance between the magnet 410 moving integrally with the IR filter 318 and the Hall sensor 400. Here, the magnet 410 may be a magnet separately provided in the IR filter 318 or a magnet included in the tilting unit 140.

As illustrated in FIG. 14, when the Hall sensor 400 is disposed on a side of the IR filter 318, the distance a, b, or c between the magnet 410, which integrally moves with the IR filter 318, and the Hall sensor 400 may vary according to a tilt of the IR filter 318. For example, as the tilt of the IR filter 318 increases, the distance between the magnet 410 moving integrally with the IR filter 318 and the Hall sensor 400 may increase.

Similarly, as illustrated in FIG. 15, when the Hall sensor 400 is disposed on a lower surface of the IR filter 318, the distance a, b, or c between the magnet 410 integrally moving with the IR filter 318 and the Hall sensor 400 may vary according to a tilt of the IR filter 318. For example, as the tilt of the IR filter 318 increases, the distance between the magnet 410 moving integrally with the IR filter 318 and the Hall sensor 400 may increase.

The Hall sensor 400 is a device that uses the Hall effect, which is a physical phenomenon in which an electromotive force is generated in proportion to a magnetic field, and is a device of which the voltage changes according to strength of the magnetic field. Examples of the Hall sensor 400 include a head-on type Hall sensor that detects a change in the distance between the Hall sensor and a magnet using a voltage that changes according to the movement of the magnet when the magnet moves forward or rearward with respect to the Hall sensor, and a sideway detection type Hall sensor that detects the number of rotations or rotational speed of a magnet using a voltage that changes according to the movement of the magnet when the magnet moves in the lateral direction with respect to the Hall sensor.

According to an embodiment of the present invention, the distance between the magnet 410 and the Hall sensor 400 may be calculated according to a value detected by the Hall sensor 400, and the tilt of the IR filter 318, i.e., a degree to which the IR filter 318 is tilted, and a shift value of an input light signal may be calculated according to the distance between the magnet 410 and the Hall sensor 400.

More specifically, referring to FIG. 16, the Hall sensor 400 includes a first Hall sensor 402 and a second Hall sensor 404, and the magnet 410 may be moved integrally with the IR filter 318.

To this end, the magnet 410 may be connected to one side of the IR filter 318 as illustrated in FIG. 16A or connected to both sides of the IR filter 318 as illustrated in FIG. 16B. Although not shown, the magnet 410 may be connected to four sides of the IR filter 318, and the position, shape, size, and number of magnets 410 may be variously modified. As illustrated in FIG. 16C, the magnet 410 may be disposed along at least one of side surfaces of the IR filter 318. In this case, the magnet 410 may be a magnetic material applied on at least one of the side surfaces of the IR filter 318.

Here, the magnet 410 is illustrated as being directly connected to the IR filter 318, but the embodiments are not limited thereto and the magnet 410 may be indirectly connected to the IR filter 318 through a connection member. Here, the connection member may be a connection member for connecting the IR filter 318 and the tilting unit 140, and the magnet 410 may also be connected to the IR filter 318 to be movable integrally with the IR filter 318 through the connection member. Here, the connection member may be a part of the IR filter 318 or a part of the tilting unit 140.

In this case, the first Hall sensor 402 and the second Hall sensor 404 may be provided at sides of the IR filter 318 to be spaced a certain distance from the magnet 410 and to form an angle of 90° or more and less than 180° with respect to the center C of the IR filter 318. According to an embodiment of the present invention, the IR filter 318 may be tilted in an X-axis direction, a Y-axis direction or a Z-axis direction. When the first Hall sensor 402 and the second Hall sensor 404 are arranged to form an angle of 90° or more and less than 180° with respect to the center C of the IR filter 318, all tilt values of the IR filter 318 when tilted in the X-axial direction, the Y-axis direction, and the Z-axis direction may be calculated and a shift value of an optical light signal may be accurately calculated using the tilt values in the X-, Y- and Z-axis directions. Here, the tilt information of the IR filter 318 may be represented by the tilt value in the X-axis direction, the tilt value in the Y-axis direction, and the tilt value in the Z-axis direction.

Alternatively, referring to FIG. 17, the first Hall sensor 402 may be disposed on a side of the IR filter 318 to be spaced a certain distance from the magnet 410 at the side of the IR filter 318, the second Hall sensor 404 may be disposed at the bottom of the IR filter 318 to be spaced a certain distance from the magnet 410, and the first Hall sensor 402 and the second Hall sensor 404 may be disposed to form an angle of 90° or more and less than 180° with respect to the center C of the IR filter 318.

Alternatively, referring to FIG. 18, the first Hall sensor 402 and the second Hall sensor 404 may be disposed at the bottom of the IR filter 318 to be spaced a certain distance from the magnet 410 and to form an angle of 90° or more and less than 180° with respect to the center C of the IR filter 318.

Parts of FIGS. 17 and 18 that are the same as those described above with reference to FIG. 16 are not redundantly described here.

Here, only example cases in which the first Hall sensor 402 and the second Hall sensor 404 are disposed at a side or bottom of the IR filter 318 are described, but the embodiments are not limited thereto, and the first Hall sensor 402 and the second Hall sensor 404 may be disposed on the IR filter 318 or may be disposed at a side of the IR filter 318 to be higher or lower than the IR filter 318.

An example case in which a tilting unit included in a ToF camera module according to an embodiment of the present invention includes a VCM will be described below.

FIG. 19 is a perspective view of a VCM and an IR filter according to an embodiment of the present invention. FIG. 20 is a diagram illustrating a process of combining a magnet assembly and an IR filter included in a VCM according to an embodiment of the present invention. FIG. 21 is a diagram illustrating a process of combining a coil assembly included in a VCM according to an embodiment of the present invention. FIG. 22 is a diagram illustrating a process of combining a magnet assembly, an IR filter, and a coil assembly according to an embodiment of the present invention. FIGS. 23 and 24 illustrate concrete examples of a VCM and a Hall sensor.

Referring to FIGS. 19 to 22, a tilting unit 140 may include a VCM 1000, and the VCM 1000 may include a magnet assembly 1100 and a coil assembly 1200 and may be combined, in contact, or connected with the IR filter 318.

The VCM 1000 may be surrounded by a lens barrel 314 and a lens holder 316, and a lens 312 may be surrounded by the lens barrel 314 or accommodated in a space within the VCM 1000. Alternatively, the lens barrel 314 may be a part of the VCM 1000.

According to an embodiment of the present invention, the magnet assembly 1100 may include a magnet holder 1110 and a plurality of magnets 1120, and the plurality of magnets 1120 may be disposed on the magnet holder 1110 to be spaced a certain distance from each other. For example, the magnet holder 1110 may have a hollow round or square ring shape and may be provided with a plurality of magnet guides 1112 for accommodating the plurality of magnets 1120. Here, the magnet holder 1110 may include a magnetic material or a soft magnetic material and may include, for example, Fe.

Next, the coil assembly 1200 may include a coil holder 1210, a plurality of coils 1220, and a coil terminal 1230. The plurality of coils 1220 may be arranged on the coil holder 1210 to be spaced a certain distance from each other so as to be paired with the plurality of magnets 1120. For example, the coil holder 1210 may have a hollow round or square ring shape and may be provided with a plurality of coil guides 1212 for accommodating the plurality of coils 1220. The coil holder 1210 may correspond to the lens barrel 314. The coil terminal 1230 may be connected to the plurality of coils 1220 and apply power to the plurality of coils 1220.

The IR filter 318 includes a glass layer holder 3182 and a glass layer 3184 supported by the glass layer holder 3182. The glass layer holder 3182 may include a first glass layer holder 3182-1 below the glass layer 3184 and a second glass layer holder 3182-2 at an upper edge of the glass layer 3184. The second glass layer holder 3182-2 may have a hollow round or square ring shape and be disposed in a hollow portion of the magnet holder 1110 to be surrounded by the magnet holder 1110. In this case, the second glass layer holder 3182-2 may include a plurality of protrusions P1, P2, P3, and P4 protruding to correspond to the plurality of magnet guides 1112 of the magnet holder 1110. The plurality of protrusions P1, P2, P3, and P4 may be moved to be in contact with or separated from the plurality of magnet guides 1112. The second glass layer holder 3182-2 may include a magnetic material or a soft magnetic material. Accordingly, the magnet holder 1110 may be a connection member connecting the IR filter 318 and a tilt unit.

When power is applied to the plurality of coils 1220 through the coil terminal 1230, a current flows through the plurality of coils 1220, and thus a magnetic field may occur between the plurality of coils 1220 and the plurality of magnets 1120.

Accordingly, an electric driving force may be generated between the plurality of magnet guides 1112 and the plurality of protrusions P1, P2, P3 and P4 of the second glass layer holder 3182-2, and the glass layer 3184 supported by the second glass layer holder 3182-2 may be tilted at a certain angle.

For example, an inclination formed between the protrusions P1 and P3 or an inclination formed between the protrusions P2 and P4 may vary according to a force applied between the plurality of magnet guides 1112 and the plurality of protrusions P1, P2, P3 and P4. In addition, a tilt of the glass layer 3184 may vary according to the inclination between the protrusions P1 and P3 or the inclination between the protrusions P2 and P4. Here, a tilt of the IR filter 318, and more specifically, the tilt of the glass layer 3184, varies according to the positions of the protrusions P1, P2, P3, and P4 of the second glass layer holder 3182-2, and thus the second glass layer holder 3182-2 may be referred to as a shaper in the present specification.

In this case, a spacer 1130 may be further disposed between the magnet holder 1110 and the first glass layer holder 3182-1 for a degree of freedom of tilting the glass layer 3184.

Here, the glass layer 3184 may be an IR pass glass layer.

According to an embodiment of the present invention, the magnet assembly 1100 may further include a magnet holder 1140. The magnet holder 1140 may support upper portions of the plurality of magnets 1120 and thus the plurality of magnets 1120 may move more stably and reliably.

As described above, according to an embodiment of the present invention, the tilt of the IR filter 318 is controlled through driving of the VCM 1000. To this end, the IR filter 318 should be disposed together with the VCM 1000 and thus needs to be disposed spaced apart from the image sensor 320.

The plurality of magnets 1120 may be disposed on both upper and lower sides and both left and right sides of the IR filter 318 as illustrated in FIG. 23 or may be disposed in a diagonal direction with respect to the IR filter 318 as illustrated in FIG. 24. In this case, at least one of the plurality of magnets 1120 may correspond to the magnet 410 that moves integrally with the IR filter 318, and the first Hall sensor 402 and the second Hall sensor 404 may be spaced a certain distance from the magnet 410 and disposed at an angle of 90° or more and less than 180° with respect to the center of the IR filter 318. Using voltages detected by the first Hall sensor 402 and the second Hall sensor 404 disposed as described above, all the tilt values of the IR filter 318 in the X-axis direction, the Y-axis direction, and the Z-axis direction and thus an actual shift value of an input light signal may be accurately calculated and SR depth information may be extracted.

Although the embodiments have been described above, these embodiments are only examples and the present invention should not be construed as being limited thereto, and various modifications and applications, which are not mentioned herein, may be made by those of ordinary skill in the field to which the present invention pertains without departing from the essential features of the present embodiment. For example, each component specifically described in the embodiments may be modified and implemented. All differences related to such modifications and applications should be construed as being included in the scope of the present invention defined in the appended claims.

DESCRIPTION OF REFERENCE NUMERALS

| | |
|---|---|
| 100: ToF camera module | 110: lighting unit |
| 120: lens unit | 130: image sensor unit |

| 140: tilting unit | 150: image control unit |
|---|---|
| 160: detection unit | |

The invention claimed is:

1. A camera module comprising:
   a light source configured to output an output light signal to be emitted to an object;
   an infrared (IR) filter and at least one lens disposed on the IR filter as a lens unit, the lens unit configured to concentrate an input light signal reflected from the object;
   a tilting unit configured to control a tilt of the IR filter so as to shift an optical path of the input light signal;
   an image sensor configured to generate an electric signal from the input light signal concentrated by the lens unit and shifted by the tilting unit;
   an image controller configured to extract depth information of the object using a phase difference between the output light signal and the input light signal, the input light signal being received by the image sensor; and
   a detector configured to detect tilt information of the IR filter and provide the tilt information of the IR filter to the image controller.

2. The camera module of claim 1, wherein the detector comprises a first Hall sensor and a second Hall sensor to detect a position of a magnet moving integrally with the IR filter, and
   wherein the first Hall sensor and the second Hall sensor are arranged to form an angle of 90° or more and less than 180° with respect to a center of the IR filter.

3. The camera module of claim 2, wherein the first Hall sensor and the second Hall sensor are arranged at positions corresponding to outer sides of the IR filter to be respectively spaced apart from the magnet and the IR filter.

4. The camera module of claim 2, wherein one of the first Hall sensor and the second Hall sensor is arranged on a side of the IR filter to be spaced a certain distance from the magnet, and the other is arranged at the bottom of the IR filter to be spaced a certain distance from the magnet.

5. The camera module of claim 2, wherein the image controller comprises:
   a shift calculation unit configured to calculate a shift value of the input light signal using the tilt information of the IR filter;
   a comparison unit configured to compare the shift value of the input light signal calculated by the shift calculation unit with a shift value stored in advance; and
   a correction unit configured to correct depth information of the object using a difference between the shift value of the input light signal and the shift value stored in advance,
   wherein the tilt information of the IR filter is obtained by the first Hall sensor and the second Hall sensor.

6. The camera module of claim 5, wherein the shift calculation unit calculates tilt values of the IR filter when tilted in an X-axis direction, a Y-axis direction, and a Z-axis direction using information regarding the position of the magnet detected by the first Hall sensor and the second Hall sensor and calculates the shift value of the input light signal using the tilt values of the IR filter in the X-axis direction, the Y-axis direction, and the Z-axis direction.

7. The camera module of claim 2, wherein the tilting unit comprises at least one of a micro-electro-mechanical-system (MEMS), a voice coil motor (VCM), and a piezoelectric element.

8. The camera module of claim 1, wherein the tilting unit shifts the optical path of the input light signal in a unit of a subpixel of the image sensor, and the subpixel is larger than zero pixel and smaller than one pixel.

9. The camera module of claim 2, wherein the tilt information of the IR filter comprises a distance information between the magnet moving integrally with the IR filter and at least one of the first Hall sensor and the second Hall sensor.

10. The camera module of claim 9, wherein as the tilt of the IR filter increases, a distance between the magnet moving integrally with the IR filter and at least one of the first Hall sensor and the second Hall sensor increases.

11. The camera module of claim 2, wherein the magnet is disposed on a side surface of the IR filter.

12. The camera module of claim 2, wherein the magnet is a magnetic material applied on a side surface of the IR filter.

13. A method of extracting depth information by a camera module, comprising:
    outputting, by a light source, an output light signal to be emitted to an object;
    concentrating, by an infrared (IR) filter and at least one lens of a lens unit, an input light signal reflected from the object;
    shifting, by tilting unit, an optical path of the input light signal by controlling a tilt of the IR filter included in the lens unit;
    detecting tilt information of the IR filter by a detector;
    generating, by an image sensor, an electric signal from the concentrated and shifted input light signal; and
    extracting, by an image controller, depth information of the object using a phase difference between the output light signal and the input light signal, which is received by the image sensor, and the tilt information of the IR filter detected by the detector.

14. The method of claim 13, wherein the detecting of the tilt information of the IR filter comprises detecting position information of a magnet moving integrally with the IR filter by a first Hall sensor and a second Hall sensor, which are arranged to form an angle of 90° or more and less than 180° with respect to a center of the IR filter.

15. The method of claim 14, wherein the extracting of the depth information of the object comprises:
    calculating a shift value of the input light signal using the tilt information of the IR filter detected using the position information of the magnet;
    comparing the shift value calculated in the calculating of the shift value of the input light signal with a value stored in advance; and
    correcting the depth information of the object using a difference between the calculated shift value and the value stored in advance.

16. The method of claim 15, wherein the calculating of the shift value of the input light signal comprises calculating tilt values of the IR filter when tilted in an X-axis direction, a Y-axis direction, and a Z-axis direction using information regarding the position of the magnet detected and calculating the shift value of the tilting unit using the tilt values of the IR filter in the X-axis direction, the Y-axis direction, and the Z-axis direction.

17. The method of claim 13, wherein the tilting unit shifts the optical path of the input light signal in a unit of a subpixel of the image sensor, and the subpixel is larger than zero pixel and smaller than one pixel.

18. The camera module of claim 1, wherein the tilting unit comprises a magnet assembly and a coil assembly, the magnet assembly comprises a magnet holder and a plurality of magnets disposed on the magnet holder to be spaced a certain distance from each other, and the coil assembly comprises a coil holder and a plurality of coils arranged on the coil holder to be spaced a certain distance from each other so as to be paired with the plurality of magnets.

19. The camera module of claim 18, wherein the IR filter comprises a glass layer holder and a glass layer supported by the glass layer holder, and the glass layer holder is disposed in a hollow portion of the magnet holder.

20. The camera module of claim 18, wherein the plurality of magnets moves integrally with the IR filter.

\* \* \* \* \*